United States Patent
Wolfe et al.

(10) Patent No.: US 11,412,771 B2
(45) Date of Patent: Aug. 16, 2022

(54) COMPOSITION TO IMPROVE ATHLETIC PERFORMANCE BY SUPPORTING MUSCLE PROTEIN SYNTHESIS AND MENTAL FOCUS

(71) Applicant: The Amino Company LLC, Los Angeles, CA (US)

(72) Inventors: Robert Reese Wolfe, Norwich, CT (US); Frederick Lee Wolfe, Rancho Mirage, CA (US)

(73) Assignee: THE AMINO COMPANY LLC, Los Angeles, CA (US)

( * ) Notice: Subject to any disclaimer, the term of this patent is extended or adjusted under 35 U.S.C. 154(b) by 459 days.

(21) Appl. No.: 16/382,993

(22) Filed: Apr. 12, 2019

(65) Prior Publication Data

US 2020/0323251 A1  Oct. 15, 2020

(51) Int. Cl.
*A23L 33/175* (2016.01)
*A23L 33/18* (2016.01)

(52) U.S. Cl.
CPC .......... *A23L 33/175* (2016.08); *A23L 33/18* (2016.08); *A23V 2002/00* (2013.01); *A23V 2200/224* (2013.01); *A23V 2200/316* (2013.01); *A23V 2200/322* (2013.01); *A23V 2250/063* (2013.01); *A23V 2250/0614* (2013.01); *A23V 2250/0624* (2013.01); *A23V 2250/0628* (2013.01); *A23V 2250/0632* (2013.01);
(Continued)

(58) Field of Classification Search
CPC ... A23L 33/18; A23L 33/175; A23V 2002/00; A23V 2200/224; A23V 2200/316; A23V 2200/322; A23V 2250/614; A23V 2250/624; A23V 2250/628; A23V 2250/63; A23V 2250/632; A23V 2250/638; A23V 2250/648; A23V 2250/654; A23V 2250/16; A23V 2250/1614; A23V 2250/306
See application file for complete search history.

(56) References Cited

U.S. PATENT DOCUMENTS 3,697,287 A * 10/1972 Winitz et al. ......... A23L 33/175
426/73
5,719,134 A *  2/1998 Schmidl ................. A23L 33/40
514/168

(Continued)

FOREIGN PATENT DOCUMENTS

WO  WO2019035953  *  2/2019

*Primary Examiner* — Anthony J Weier
(74) *Attorney, Agent, or Firm* — Magleby, Cataxinos & Greenwood, P.C.

(57) ABSTRACT

The present invention generally relates to compositions and methods for supporting exercise performance or activities of daily living. The compositions described herein are pharmaceutical or nutritional compositions suitable for enhancing exercise performance. The compositions are based on a specially formulated mixture of essential amino acids (EAAs) with additional components. The compositions target support of muscle protein synthesis and reduction of muscle breakdown during exercise, increasing muscle blood flow during exercise, decreasing the perception of fatigue by supporting optimal availability of neurotransmitter precursors, providing energy for rapids bursts of exertion during exercise, and maintaining adequate electrolyte balance during exercise.

19 Claims, 8 Drawing Sheets

(52) U.S. Cl.
CPC .............. *A23V 2250/0638* (2013.01); *A23V 2250/0648* (2013.01); *A23V 2250/0654* (2013.01); *A23V 2250/16* (2013.01); *A23V 2250/1614* (2013.01); *A23V 2250/306* (2013.01)

(56) References Cited

U.S. PATENT DOCUMENTS

| | | | | |
|---|---|---|---|---|
| 5,728,678 | A * | 3/1998 | Trimbo | A61P 13/02 |
| | | | | 514/5.5 |
| 9,533,946 | B1 * | 1/2017 | De Bandt | A23K 50/50 |
| 9,597,367 | B2 * | 3/2017 | Wolfe | A61K 31/202 |
| 2002/0106436 | A1 * | 8/2002 | Gohman | A23L 33/18 |
| | | | | 426/590 |
| 2007/0141121 | A1 * | 6/2007 | Calton | A23L 33/105 |
| | | | | 424/439 |
| 2010/0267831 | A1 * | 10/2010 | Kobayashi | A61P 3/02 |
| | | | | 514/561 |
| 2011/0064720 | A1 * | 3/2011 | Amato | A61K 38/4873 |
| | | | | 424/94.65 |
| 2011/0138888 | A1 * | 6/2011 | Elshorbagy | A61K 31/198 |
| | | | | 73/61.43 |
| 2014/0155448 | A1 * | 6/2014 | Kato | A61K 31/405 |
| | | | | 514/400 |
| 2016/0309753 | A1 * | 10/2016 | Calton | A61K 31/198 |
| 2018/0280430 | A1 * | 10/2018 | Bortz | A61K 36/064 |
| 2019/0247347 | A1 * | 8/2019 | Nishitani | A61K 31/405 |
| 2021/0205252 | A1 * | 7/2021 | Gingrich | A23L 33/29 |

\* cited by examiner

COMPOSITION TO IMPROVE ATHLETIC PERFORMANCE BY SUPPORTING MUSCLE PROTEIN SYNTHESIS AND MENTAL FOCUS

FIELD OF THE INVENTION

The present invention generally relates to compositions and methods for supporting exercise performance or activities of daily living. The compositions described herein are pharmaceutical or nutritional compositions suitable for enhancing exercise performance. The compositions are based on a specially formulated mixture of essential amino acids (EAAs) with additional components. The compositions target support of muscle protein synthesis and reduction of muscle breakdown during exercise, increasing muscle blood flow during exercise, decreasing the perception of fatigue by supporting optimal availability of neurotransmitter precursors, providing energy for rapids bursts of exertion during exercise, and maintaining adequate electrolyte balance during exercise.

BACKGROUND OF THE INVENTION

Muscle protein is in a constant state of turnover, meaning muscle protein is being broken down and synthesized continuously. Exercise workouts are undertaken to improve muscle performance. Regardless of the nature of the exercise workout, the principle physiological mechanism underlying improvements in muscle function and muscle size is the balance between muscle protein synthesis and muscle protein breakdown. Exercise causes an increase in blood flow to the muscle, which in essence "flushes out" intracellular essential amino acids (EAAs) into the blood. When concentrations of EAAs inside the muscle cells are lowered, the rate of muscle protein breakdown is increased. In addition, intracellular EAAs serve as precursors for the synthesis of new muscle protein. As the muscle EAAs are flushed from the intracellular fluid to the blood, there are fewer EAAs available for reincorporation into muscle protein via protein synthesis. The impaired ability of muscle protein synthesis to keep pace with muscle protein breakdown during exercise is also due to an increased oxidation of certain (but not all) EAAs. Some of the EAAs released in the process of muscle protein breakdown are oxidized to produce the energy needed to support muscle contraction. Once EAAs are oxidized, they are not available to be reincorporated into muscle protein.

Leucine is the most abundant EAA in muscle and also can play a role as a "nutraceutical", meaning that in addition to its role as a precursor for protein synthesis it also serves as a signal to the molecular mechanisms in muscle cells that are involved in the initiation of protein synthesis. Consequently, leucine availability can become rate limiting in terms of the synthesis of muscle protein during exercise. For example, even just light exercise causes a 4-fold increase in leucine oxidation, while the oxidation of other EAAs such as lysine and phenylalanine do not increase. The disparate rate of oxidation of different EAAs reduces leucine concentration in blood, creating an imbalance in EAA concentrations in the blood. Leucine depletion in the blood during exercise not only decreases synthesis of new muscle proteins, but also induces the perception of fatigue. Tryptophan, the precursor to serotonin, and leucine are structurally similar and compete for the same transporter for entry into the brain. When the blood concentration of leucine falls relative to tryptophan concentration during prolonged aerobic exercise, more tryptophan enters the brain and the amount of serotonin is increased. An increase of brain serotonin during exercise can decrease mental focus, giving the perception of fatigue even when physical capacity is not limited.

The notion that leucine can be rate limiting during exercise has led to the popularity of dietary supplements of leucine or the branched chain amino acids (BCAAs) leucine, isoleucine and valine. However, provision of these supplements has proven ineffective in stimulating muscle protein synthesis, during exercise or in any other circumstance. In addition, increased BCAA levels only slightly improve mental focus. This is because an increase in BCAAs will not only decrease tryptophan uptake by the brain, but also limit the uptake of phenylalanine. Phenylalanine is the precursor for the synthesis of dopamine, which is the principal excitatory neurotransmitter in the brain. Mental focus and alertness is the result of the balance between dopamine and serotonin in the brain. Consequently, an EAA formulation with abundant BCAAs as well as phenylalanine will most effectively enhance mental focus during exercise. Therefore, there is a need in the art for compositions comprising a unique combination of ingredients for improving exercise performance, wherein the combination of ingredients accounts for the disparate rates of oxidation of different EAAs and promotes mental focus during exercise. Such compositions can result in an increase in muscle protein synthesis and a reduction of muscle protein breakdown during and immediately following exercise, ultimately increasing muscle mass, muscle strength, and muscle function, and can also improve exercise performance by reducing the perception of fatigue.

DETAILED DESCRIPTION OF THE INVENTION

Figure 1:
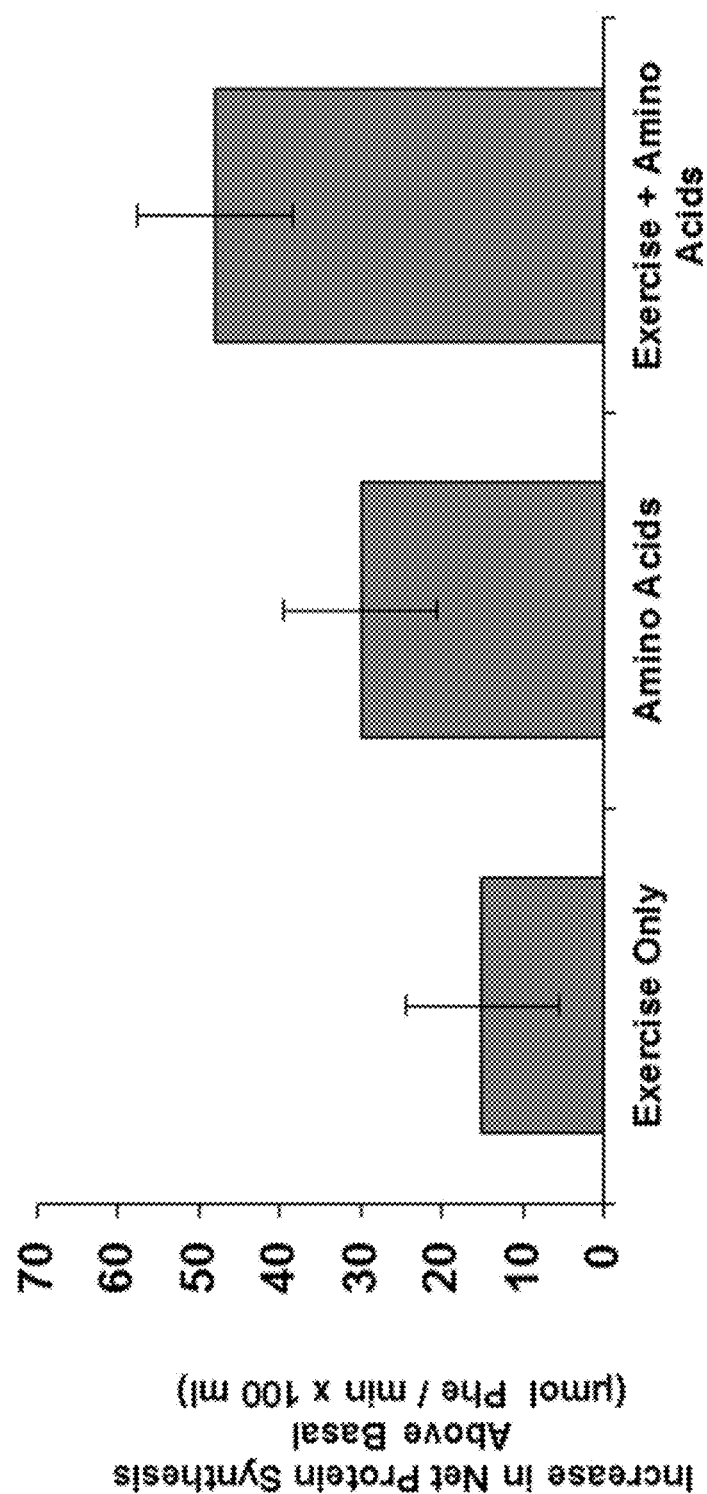
FIG. 1 depicts a graph showing the rate of muscle protein synthesis in human subjects over a 3 hour period wherein the subjects were either infused intravenously with a balanced amino acid mixture (approximately 0.15 g·kg$^{-1}$·h$^{-1}$ for 3 hours), subjected to a leg resistance exercise routine, or subjected to a leg resistance exercise routine while infused intravenously with a balanced amino acid mixture (approximately 0.15 g·kg$^{-1}$ h$^{-1}$ for 3 hours). Error bars represent standard error of mean (SE) assessed via ANOVA.

Current exercise performance compositions have proven ineffective in stimulating muscle protein synthesis while failing to correct the decline in mental focus during exercise. Importantly, the present disclosure provides compositions comprised of a combination of ingredients directed toward improving exercise performance, as detailed below. In general, the compositions disclosed herein comprise one or more amino acids. In various embodiments, compositions of the present disclosure comprise one or more essential amino acids (EAAs). In various embodiments, compositions of the present disclosure comprise one or more essential amino acids (EAAs) and one or more non-essential amino acids (NEAAs). In various embodiments, compositions of the present disclosure stimulate muscle protein synthesis during and/or immediately following exercise. In various embodiments, compositions of the present disclosure correct the decline in mental focus during exercise.

(I) Compositions

One aspect of the present disclosure encompasses a composition comprising one or more amino acids. These amino acids may comprise one or more essential amino acids (EAAs) and one or more non-essential amino acids (NEAAs). A composition disclosed herein may further comprise one or more nutrient elements. A composition disclosed herein may further comprise one or more excipients.

(a) Amino Acids

In various embodiments, compositions disclosed herein comprise at least one or more amino acids. As used herein, "amino acids" are represented by their full name, their three letter code, or their one letter code as well known in the art. Amino acid residues are abbreviated as follows: Phenylalanine is Phe or F; Leucine is Leu or L; Isoleucine is Ile or I; Methionine is Met or M; Valine is Val or V; Serine is Ser or S; Proline is Pro or P; Threonine is Thr or T; Alanine is Ala or A; Tyrosine is Tyr or Y; Histidine is His or H; Glutamine is Gln or Q; Asparagine is Asn or N; Lysine is Lys or K; Aspartic Acid is Asp or D; Glutamic Acid is Glu or E; Cysteine is Cys or C; Tryptophan is Trp or W; Arginine is Arg or R; and Glycine is Gly or G. An amino acid as disclosed herein may be either naturally or non-naturally occurring. As used herein, a "naturally occurring amino acid" is one that has the general core structure

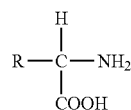

and that is synthesized in nature. Non-limiting examples of naturally occurring amino acids that may be used in the present invention include alanine, arginine, asparagine, aspartic acid, carnitine, cysteine, glutamine, glutamic acid, glycine, histidine, isoleucine, leucine, lysine, methionine, phenylalanine, proline, serine, threonine, tryptophan, tyrosine, valine, and derivatives, analogs, and combinations thereof. The present invention may include levorotary (L) stereoisomers of such amino acids.

As used herein, a "non-naturally occurring amino acid" may be an analog, derivative and/or enantiomer of a naturally occurring amino acid. The term "non-naturally occurring amino acid" includes, but is not limited to, amino acids that occur naturally by modification of a naturally encoded amino acid but are not themselves incorporated into a growing polypeptide chain by the translation complex. Non-limiting examples of non-naturally occurring amino acids that may be used in the present invention include L-hydroxypropyl, L-3,4-dihydroxyphenylalanyl, alpha-amino acids such as L-alpha-hydroxylysyl and D-alpha-methylalanyl, L-alpha-methylalanyl, beta-amino acids, N-acetylglucosaminyl-L-serine, N-acetylglucosaminyl-L-threonine, O-phosphotyrosine, and isoquinolyl.

As used herein, the term "amino acid" may also encompass chemically modified amino acids, including but not limited to salts, amino acid derivatives (such as amides), and substitutions. Amino acids contained within the compositions of the present invention can be modified by methylation, amidation, acetylation or substitution with other chemical groups. In various embodiments, amino acids used in compositions disclosed herein may be produced by any fermentation method known in the art. In other embodiments, amino acids used in compositions disclosed herein may be produced by any hydrolysis method know in the art. In preferred embodiments, amino acids used in compositions disclosed herein may be of food grade quality or pharmaceutical grade quality.

In various embodiments, amino acids used in compositions disclosed herein may comprise one or more essential amino acids (EAAs). As used herein, "essential amino acids" are amino acids that cannot be made by the body of a subject and that are components of proteins in the subject. EAAs suitable for compositions disclosed herein may comprise one or more free EAAs, one or more EAA derivatives thereof, or one or more EAA precursors thereof. In various embodiments, a composition disclosed herein may comprise up to about 50%, up to about 55%, up to about 60%, up to about 65%, up to about 70%, up to about 75%, up to about 80%, up to about 85%, up to about 90%, or up to about 95% total EAAs by total weight of the composition.

In embodiments in which the composition comprises a unique mixture of eight EAAs, EAAs may be but are not limited to histidine, isoleucine, leucine, lysine, methionine, phenylalanine, threonine, and valine or their hydroxy analogs. In other embodiments, compositions may comprise additional EAAs. In yet other embodiments, compositions disclosed herein may not be supplemented with tryptophan. In preferred embodiments, compositions may comprise L-histidine, L-isoleucine, L-leucine, L-lysine, L-methionine, L-phenylalanine, L-valine, and L-threonine.

In other embodiments, a composition comprising histidine may comprise about 4% to about 8% histidine by weight of total EAAs weight of the composition. In other embodiments, a composition comprising histidine may comprise about 4%, about 4.5%, about 5%, about 5.5%, about 6%, about 6.5%, about 7%, about 7.5%, or about 8% histidine by weight of total EAAs weight of the composition. In preferred embodiments, a composition comprising histidine may comprise about 3% to about 7% L-histidine by weight of total EAAs weight of the composition. In other embodiments, a composition comprising histidine may comprise about 4% to about 8% histidine by total weight of the composition. In other embodiments, a composition comprising histidine may comprise about 3%, about 3.5%. about 4%, about 4.5%, about 5%, about 5.5%, about 6%, about 6.5%, about 7%, about 7.5%, or about 8% histidine by total weight of the composition.

In other embodiments, a composition comprising isoleucine may comprise about 10% to about 14% isoleucine by weight of total EAAs weight of the composition. In other embodiments, a composition comprising isoleucine may comprise about 10%, about 10.5%, about 11%, about 11.5%, about 12%, about 12.5%, about 13%, about 13.5%, or about 14% isoleucine by weight of total EAAs weight of the composition. In preferred embodiments, a composition comprising isoleucine may comprise about 10% to about 14% L-isoleucine by weight of total EAAs weight of the composition. In other embodiments, a composition comprising isoleucine may comprise about 8% to about 13% isoleucine by total weight of the composition. In other embodiments, a composition comprising isoleucine may comprise about 8%, about 8.5%, about 9%, about 9.5%, about 10%, about 10.5%, about 11%, about 11.5%, about 12%, about 12.5%, about 13%, about 13.5%, or about 14% isoleucine by total weight of the composition.

In other embodiments, a composition comprising leucine may comprise about 23% to about 27% leucine by weight of total EAAs weight of the composition. In other embodiments, a composition comprising leucine may comprise about 23%, about 23.5%, about 24%, about 24.5%, about 25%, about 25.5%, about 26%, about 26.5%, or about 27% leucine by weight of total EAAs weight of the composition. In preferred embodiments, a composition comprising leucine may comprise about 23% to about 27% L-leucine by weight of total EAAs weight of the composition. In other embodiments, a composition comprising leucine may comprise about 23% to about 27% leucine by total weight of the composition. In other embodiments, a composition comprising leucine may comprise about 20%, about 20.5%, about 21% about 21.5% about 22%, about 22.5%, about 23%, about 23.5%, about 24%, about 24.5%, about 25%, about 25.5%, about 26%, about 26.5%, or about 27% leucine by total weight of the composition.

In other embodiments, a composition comprising lysine may comprise about 14% to about 18% lysine by weight of total EAAs weight of the composition. In other embodiments, a composition comprising lysine may comprise about 14%, about 14.5%, about 15%, about 15.5%, about 16%, about 16.5%, about 17%, about 17.5%, or about 18% lysine by weight of total EAAs weight of the composition. In preferred embodiments, a composition comprising lysine may comprise about 14% to about 18% L-lysine by weight of total EAAs weight of the composition. In other embodiments, a composition comprising lysine may comprise about 12% to about 18% lysine by total weight of the composition. In other embodiments, a composition comprising lysine may comprise about 12%, about 12.5%, about 13%, about 13.5%, about 14%, about 14.5%, about 15%, about 15.5%, about 16%, about 16.5%, about 17%, about 17.5%, or about 18% lysine by total weight of the composition.

In other embodiments, a composition comprising methionine may comprise about 2% to about 5% methionine by weight of total EAAs weight of the composition. In other embodiments, a composition comprising methionine may comprise about 2%, about 2.5%, about 3%, about 3.5%, about 4%, about 4.5%, or about 5% methionine by weight of total EAAs weight of the composition. In preferred embodiments, a composition comprising methionine may comprise about 2% to about 5% L-methionine by weight of total EAAs weight of the composition. In other embodiments, a composition comprising methionine may comprise about 2% to about 5% methionine by total weight of the composition. In other embodiments, a composition comprising methionine may comprise about 2%, about 2.5%, about 3%, about 3.5%, about 4%, about 4.5%, or about 5% methionine by total weight of the composition.

In other embodiments, a composition comprising phenylalanine may comprise about 15% to about 19% phenylalanine by weight of total EAAs weight of the composition. In other embodiments, a composition comprising phenylalanine may comprise about 15%, about 15.5%, about 16%, about 16.5%, about 17%, about 17.5%, about 18%, about 18.5%, or about 19% phenylalanine by weight of total EAAs weight of the composition. In preferred embodiments, a composition comprising phenylalanine may comprise about 15% to about 19% L-phenylalanine by weight of total EAAs weight of the composition. In other embodiments, a composition comprising phenylalanine may comprise about 12% to about 19% phenylalanine by total weight of the composition. In other embodiments, a composition comprising phenylalanine may comprise about 12%, about 12.5%, about 13%, about 13.5% about 14%, about 14.5%15%, about 15.5%, about 16%, about 16.5%, about 17%, about 17.5%, about 18%, about 18.5%, or about 19% phenylalanine by total weight of the composition.

In other embodiments, a composition comprising valine may comprise about 10% to about 14% valine by weight of total EAAs weight of the composition. In other embodiments, a composition comprising valine may comprise about 10%, about 10.5%, about 11%, about 11.5%, about 12%, about 12.5%, about 13%, about 13.5%, or about 14% valine by weight of total EAAs weight of the composition. In preferred embodiments, a composition comprising valine may comprise about 10% to about 14% L-valine by weight of total EAAs weight of the composition. In other embodiments, a composition comprising valine may comprise about 8% to about 15% valine by total weight of the composition. In other embodiments, a composition comprising valine may comprise about 8%, about 8.5%, about 9%, about 9.5%, 10%, about 10.5%, about 11%, about 11.5%, about 12%, about 12.5%, about 13%, about 13.5%, or about 14% valine by total weight of the composition.

In other embodiments, a composition comprising threonine may comprise about 7% to about 11% threonine by weight of total EAAs weight of the composition. In other embodiments, a composition comprising threonine may comprise about 7%, about 7.5%, about 8%, about 8.5%, about 9%, about 9.5%, about 10%, about 10.5%, or about 11% threonine by weight of total EAAs weight of the composition. In preferred embodiments, a composition comprising threonine may comprise about 5% to about 11% L-threonine by weight of total EAAs weight of the composition. In other embodiments, a composition comprising threonine may comprise about 5%, about 5.5%, about 6%, about 6.5%, about 7% to about 11% threonine by total weight of the composition. In other embodiments, a composition comprising threonine may comprise about 7%, about 7.5%, about 8%, about 8.5%, about 9%, about 9.5%, about 10%, about 10.5%, or about 11% threonine by total weight of the composition.

In various embodiments, a composition may compromise about 4% to about 8% histidine by weight of total EAAs weight of the composition, about 10% to about 14% isoleucine by weight of total EAAs weight of the composition, about 14% to about 18% lysine by weight of total EAAs weight of the composition, about 2% to about 5% methionine by weight of total EAAs weight of the composition, about 15% to about 19% phenylalanine by weight of total EAAs weight of the composition, about 10% to about 14% valine by weight of total EAAs weight of the composition, about 7% to about 11% threonine by weight of total EAAs weight of the composition, and about 23% to about 27% leucine by weight of total EAAs weight of the composition.

In still other embodiments, a composition may compromise histidine, isoleucine, lysine, methionine, phenylalanine, valine, threonine, and leucine in a ratio of wherein histidine is about 2 to about 4 parts of the total EAAs in the composition, isoleucine is about 5 to about 7 parts of the total EAAs in the composition, lysine is about 7 to about 9 parts of the total EAAs in the composition, methionine is about 1 to about 2.5 parts of the total EAAs in the composition, phenylalanine is about 7.5 to about 9.5 parts of the total EAAs in the composition, valine is about 5 to about 7 parts of the total EAAs in the composition, threonine is about 3.5 to about 5.5 parts of the total EAAs in the composition, and leucine is about 11.5 to about 13.5 parts of the total EAAs in the composition.

In preferred embodiments, a composition may compromise about 6% L-histidine, about 12% L-isoleucine, about 16% L-lysine, about 3.5% L-methionine, about 17% L-phenylalanine, about 12% L-valine, about 9% L-threonine, and about 25% L-leucine by weight of total EAAs.

In various embodiments, amino acids used in compositions disclosed herein may comprise non-essential amino acids (NEAAs). As used herein, "non-essential amino acids" are those amino acids that are synthesized in the body of a subject. NEAAs suitable for compositions disclosed herein may comprise one or more free NEAAs, one or more NEAA derivatives thereof, or one or more NEAA precursors thereof. In various embodiments, a composition disclosed herein may comprise about 7% to about 19% total NEAAs by total weight of the composition. In various embodiments, a composition disclosed herein may comprise about 7%, about 7.5%, about 8%, about 8.5%, about 9%, about 9.5%, about 10%, about 10.5%, about 11%, about 11.5%, about 12% about 12.5%, about 13%, about 13.5%, about 14%, about 14.5%, about 15%, about 15.5%, about 16%, about 16.5%, about 17%, about 17.5%, about 18%, about 18.5%, or about 19% total NEAAs by total weight of the composition.

In embodiments in which the composition comprises one or more NEAAs, NEAAs may be but are not limited to alanine, asparagine, aspartic acid, creatine and glutamic acid or their derivatives and precursors thereof. In various embodiments, NEAAs used in compositions disclosed herein may comprise one or more precursors of arginine. In an aspect, a precursor of arginine suitable for the compositions disclosed herein may be citrulline.

In various embodiments, a composition disclosed herein comprising citrulline may comprise about 3.5% to about 18.5% citrulline by total weight of the composition. In other embodiments, a composition comprising citrulline may comprise about 3.5%, about 4.0%, about 4.5%, about 5.0%, about 5.5%, about 6.0%, about 6.5%, about 7.0%, about 7.5%, about 8.0%, about 8.5%, about 9.0%, about 9.5%, about 10%, about 10.5%, about 11%, about 11.5%, about 12%, about 12.5%, about 13%, about 13.5%, about 14%, about 14.5%, about 15%, about 15.5%, about 16%, about 16.5%, about 17%, about 17.5%, about 18%, or about 18.5% citrulline by total weight of the composition.

In various embodiments, NEAAs used in compositions disclosed herein may comprise one or more derivatives of NEAAs. In an aspect, a derivative of NEAAs may be synthesized from one or more NEAAs. In another aspect, a NEAA synthesized from one or more NEAAs suitable for the compositions disclosed herein may be creatine.

In various embodiments, a composition disclosed herein comprising creatine may comprise about 3.5% to about 18.5% creatine by total weight of the composition. In other embodiments, a composition comprising creatine may comprise about 3.5%, about 4.0%, about 4.5%, about 5.0%, about 5.5%, about 6.0%, about 6.5%, about 7.0%, about 7.5%, about 8.0%, about 8.5%, about 9.0%, about 9.5%, about 10%, about 10.5%, about 11%, about 11.5%, about 12%, about 12.5%, about 13%, about 13.5%, about 14%, about 14.5%, about 15%, about 15.5%, about 16%, about 16.5%, about 17%, about 17.5%, about 18%, or about 18.5% creatine by total weight of the composition.

In various embodiments, compositions disclosed herein comprise at least one or more EAAs and at least one or more NEAAs. In other embodiments, compositions comprise about 1% NEAAs and about 99% EAAs, about 5% NEAAs and about 95% EAAs, about 10% NEAAs and about 90% EAAs, about 15% NEAAs and about 85% EAAs, or about 20% NEAAs and about 80% EAAs by weight of total weight of the composition.

(b) Nutrient Elements

In various embodiments, compositions disclosed herein may comprise one or more nutrient elements. As used herein, "nutrient elements" are substances that meet an essential nutritional need of a subject. Non limiting examples of nutrient elements comprise of vitamins, minerals, electrolytes, trace elements, and carbohydrates.

In various embodiments, compositions disclosed herein may comprise one or more vitamins and similar compounds. Non-limiting examples of vitamins and similar compounds suitable for compositions disclosed herein comprise vitamin A, vitamin D3, vitamin C, vitamin E, folic acid, thiamine, riboflavin, niacin, vitamin B6, vitamin B12, biotin, pantothenic acid, and vitamin K1. In some embodiments, compositions disclosed herein may comprise about 0.1% to about 10% total of one or more vitamins and similar compounds by weight of total weight of the composition.

In various embodiments, compositions disclosed herein may comprise one or more carbohydrates. In other embodiments, compositions disclosed herein may comprise one or more carbohydrates wherein the carbohydrates are selected from one or more simple saccharides. Non-limiting examples of simple saccharides include glucose, dextrose, fructose, corn syrup, and sucrose. In yet other embodiments, compositions disclosed herein may comprise one or more carbohydrates wherein the carbohydrates are selected from one or more complex saccharides. Non-limiting examples of complex saccharides include polyglucose and malto-dextrin. In still other embodiments, compositions disclosed herein may comprise a mixture of simple and complex saccharides. In an aspect, the ratio of simple saccharides to complex saccharides is about 75:25, about 50:50, or about 25:75. In some embodiments, compositions disclosed herein may comprise about 0.1% to about 10% total of one or more carbohydrates by weight of total weight of the composition.

In various embodiments, compositions disclosed herein may comprise at least one or more minerals and trace elements. Non-limiting examples of minerals and trace elements suitable for compositions disclosed herein comprise iron, magnesium, copper, zinc, manganese, selenium, molybdenum, chromium, and iodide. In some embodiments, compositions disclosed herein may comprise about 0.1% to about 10% total of one or more minerals and/or trace elements by weight of total weight of the composition.

In various embodiments, compositions disclosed herein may comprise at least one or more electrolytes. Non-limiting examples of electrolytes suitable for compositions disclosed herein comprise sodium, potassium, chloride, calcium, and phosphate. In preferred embodiments, compositions disclosed herein may comprise at least one or more electrolytes selected from the group comprising sodium and potassium.

In other embodiments, compositions disclosed herein may comprise about 0.25% to about 3% sodium by weight of total weight of the composition. In still other embodiments, compositions disclosed herein may comprise about 0.25%, about 0.50%, about 0.75%, about 1.0%, about 1.25%, about 1.50%, about 1.75%, about 2.0%, about 2.25%, about 2.50%, about 2.75%, or about 3.0% sodium by weight of total weight of the composition.

In other embodiments, compositions disclosed herein may comprise about 0.01% to about 1% potassium by weight of total weight of the composition. In still other embodiments, compositions disclosed herein may comprise about 0.01%, about 0.05%, about 0.10%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.85%, about 0.9%, about 0.95%, or about 1% potassium by weight of total weight of the composition.

In still other embodiments, compositions disclosed herein may comprise about 0.25% to about 3% sodium by weight of total weight of the composition and about 0.01% to about 1% potassium by weight of total weight of the composition. In other embodiments, compositions may comprise about 0.55% to about 2% sodium by weight of total weight of the composition and about 0.1% to about 0.75% potassium by weight of total weight of the composition.

(c) Caffeine

In various embodiments, compositions disclosed herein may comprise caffeine. In an aspect, caffeine comprising a composition herein may be synthetic caffeine. As used herein the term "synthetic caffeine" encompasses all non-naturally derived or formulated caffeine, including but not limited to pharmaceutical grade caffeine. In another aspect, caffeine comprising a composition herein may be naturally-occurring caffeine, or a derivative or metabolite thereof, such as caffeine derived from naturally-occurring caffeine-containing plants, herbs or substances. Non-limiting examples of sources for naturally-occurring caffeine include guarana, coffee, cocoa, cola nut, maté, and tea extracts. In some embodiments, compositions disclosed herein may comprise naturally-occurring caffeine derived from one or more naturally-occurring caffeine-containing plants, herbs, substances, or a combination thereof. In some embodiments, compositions disclosed herein may comprise one or more of synthetic caffeine, naturally-occurring caffeine, or a combination thereof. In other embodiments, compositions disclosed herein may comprise pharmaceutical grade caffeine. In still other embodiments, compositions disclosed herein may comprise food grade caffeine.

In various embodiments, compositions disclosed herein may comprise about 0.7% to about 3.7% caffeine by weight of total weight of the composition. In other embodiments, compositions disclosed herein may comprise about 0.7%, about 1.05%, about 1.4%, about 1.75%, about 2.1%, about 2.45%, about 2.8%, about 3.15%, about 3.5%, or about 3.7% caffeine by weight of total weight of the composition.

(d) Excipients

In various embodiments, compositions disclosed herein may comprise one or more excipients. As used herein, "excipients" refers to any substance that aids in formulating the composition to the desired form. Non-limiting examples of excipients include a buffering agent, a preservative, a stabilizer, a binder, a compaction agent, a lubricant, a dispersion enhancer, a disintegration agent, a flavoring agent, a sweetener, a coloring agent, and combinations of any of these agents.

In one embodiment, excipients comprising a composition may be one or more buffering agents. Non-limiting examples of suitable buffering agents include sodium citrate, magnesium carbonate, magnesium bicarbonate, calcium carbonate, and calcium bicarbonate.

In one embodiment, excipients comprising a composition may be one or more preservatives. Suitable examples of preservatives include, but are not limited to, antioxidants, such as alpha-tocopherol or ascorbate, and antimicrobials, such as parabens, chlorobutanol, phenol, or combinations thereof.

In another embodiment, excipients comprising a composition may be one or more binders. Suitable binders include, but are not limited to, starches, pregelatinized starches, gelatin, polyvinylpyrolidone, cellulose, methylcellulose, sodium carboxymethylcellulose, ethylcellulose, polyacrylamides, polyvinyloxoazolidone, polyvinylalcohols, C12-C18 fatty acid alcohol, polyethylene glycol, polyols, saccharides, oligosaccharides, polypeptides, oligopeptides, and combinations thereof.

In various embodiments, excipients comprising a composition may be one or more lubricants. Suitable non-limiting examples of lubricants include, but are not limited to, magnesium stearate, calcium stearate, zinc stearate, hydrogenated vegetable oils, sterotex, polyoxyethylene monostearate, talc, polyethyleneglycol, sodium benzoate, sodium lauryl sulfate, magnesium lauryl sulfate, light mineral oil.

In various embodiments, excipients comprising a composition may be one or more dispersion enhancers. Suitable dispersants may include, but are not limited to, starch, alginic acid, polyvinylpyrrolidones, guar gum, kaolin, bentonite, purified wood cellulose, sodium starch glycolate, isoamorphous silicate, and microcrystalline cellulose as high HLB emulsifier surfactants.

In yet another embodiment, excipients comprising a composition may be one or more disintegrants. In an aspect, a disintegrant may be a non-effervescent disintegrant. Suitable examples of non-effervescent disintegrants include, but are not limited to, starches such as corn starch, potato starch, pregelatinized and modified starches thereof, sweeteners, clays, such as bentonite, micro-crystalline cellulose, alginates, sodium starch glycolate, gums such as agar, guar, locust bean, karaya, pecitin, and tragacanth. In another aspect, a disintegrant may be an effervescent disintegrant. Suitable effervescent disintegrants include, but are not limited to, sodium bicarbonate in combination with citric acid, and sodium bicarbonate in combination with tartaric acid.

In various embodiments, excipients comprising a composition may include one or more flavoring agents. In various embodiments, flavoring agent(s) may include sweeteners, synthetic flavor oils and flavoring aromatics and/or natural oils, extracts from plants, leaves, flowers, fruits, combinations thereof, or any other flavor recognized by those knowledgeable in the art. By way of non-limiting examples, these may include cinnamon oils, oil of wintergreen, peppermint oils, clover oil, hay oil, anise oil, eucalyptus, vanilla, citrus oil, such as lemon oil, orange oil, grape and grapefruit oil, and fruit essences including apple, peach, pear, strawberry, raspberry, cherry, plum, pineapple, and apricot. In another embodiment, excipients comprising a composition may include a sweetener. By way of non-limiting example, the sweetener may be selected from glucose (corn syrup), dextrose, invert sugar, fructose, and mixtures thereof (when not used as a carrier); saccharin and its various salts such as the sodium salt; dipeptide sweeteners such as aspartame; dihydrochalcone compounds, glycyrrhizin; Stevia Rebaudiana (Stevioside); chloro derivatives of sucrose such as sucralose; and sugar alcohols such as sorbitol, mannitol, sylitol, and the like. Also contemplated are hydrogenated starch hydrolysates and the synthetic sweetener 3,6-dihydro-6-methyl-1,2,3-oxathiazin-4-one-2,2-dioxide, particularly the potassium salt (acesulfame-K), and sodium and calcium salts thereof.

In another embodiment, excipients comprising a composition may include actives, emulsifying agents, suspending agents, diluents, sweeteners, coloring agents, and flavoring agents. Depending upon the embodiment, it may be desirable to provide a coloring agent in the outer layer in addition to or instead of flavoring. Suitable color additives include food, drug and cosmetic colors (FD&C), drug and cosmetic colors (D&C), or external drug and cosmetic colors (Ext. D&C). These colors or dyes, along with their corresponding lakes, and certain natural and derived colorants may be suitable for use in compositions described herein depending on the embodiment.

(e) Dosage Forms

In various embodiments, compositions disclosed herein may be an oral dosage form. As used herein, the term "oral dosage form" refers to a dosage form that comprises pharmaceutically acceptable ingredients and is to be administered orally to a subject. An oral dosage form may be classified, for example, as a dietary supplement, a drug, and/or a biologic material depending on the contents of the oral dosage form, its intended use, and the country in which it is sold. A dosage form may be intended to treat or prevent a condition or disease, or the symptoms associated therewith. A dosage form may also be a means of addressing a lack of availability of a critical material in an individual's diet. It is not a requirement that a dosage form is classified as a drug. A dosage form may, for example but not limited to, be a dietary supplement.

In various embodiments, compositions disclosed herein may be a liquid dosage form. Non-limiting examples of suitable liquid dosage forms include solutions or suspensions in water, pharmaceutically acceptable fats and oils, alcohols or other organic solvents, including esters, emulsions, syrups or elixirs, suspensions, solutions and/or suspensions reconstituted from non-effervescent granules and effervescent preparations reconstituted from effervescent granules.

In various embodiments, compositions disclosed herein may be a solid dosage form. In other embodiments, a solid dosage form of a composition disclosed herein may be an oral dosage form. In yet other embodiments, a solid dosage form of a composition disclosed herein may be a tablet, a capsule, a granule or a powder. In still other embodiments, a solid dosage composition may be incorporated into a food product. In other embodiments, a solid dosage composition may be incorporated into a food product. In an aspect, a food product for use herein may be a drink. Non-limiting examples of a suitable drink include fruit juice, a fruit drink, an artificially flavored drink, an artificially sweetened drink, a carbonated beverage, a sports drink, and so forth. In another aspect, the food product may also be a solid foodstuff. Suitable examples of a solid foodstuff include a food bar, a snack bar, a cookie, a brownie, a muffin, a cracker, and the like.

(II) Uses of Compositions

In various embodiments, compositions disclosed herein comprise a formulation effective for increasing muscle protein synthesis, for enhancing exercise performance, for increasing muscle blood flow during exercise, for decreasing perception of fatigue during exercise, for providing energy for rapids bursts of exertion during exercise, or for maintaining and/or correcting adequate electrolyte balance during exercise following administration to a subject.

A suitable subject includes a human, a livestock animal, a companion animal, a lab animal, or a zoological animal. In some embodiments, the subject may be a rodent, e.g., a mouse, a rat, a guinea pig, etc. In other embodiments, the subject may be a livestock animal. Non-limiting examples of suitable livestock animals may include pigs, cows, horses, goats, sheep, llamas and alpacas. In yet other embodiments, the subject may be a companion animal. Non-limiting examples of companion animals may include pets such as dogs, cats, rabbits, and birds. In yet other embodiments, the subject may be a zoological animal. As used herein, a "zoological animal" refers to an animal that may be found in a zoo. Such animals may include non-human primates, large cats, wolves, and bears. In a specific embodiment, the animal is a laboratory animal. Non-limiting examples of a laboratory animal may include rodents, canines, felines, and non-human primates. In certain embodiments, the animal is a rodent. Non-limiting examples of rodents may include mice, rats, guinea pigs, etc. In preferred embodiments, the subject is a human.

In some embodiments, the subject may be young, middle-aged, or elderly. As used herein, "young" refers to a human subject that is up to about 40 years of age. As used herein, "middle-aged" refers to a human subject that is about 40 years of age to about 65 years of age. As used herein, "elderly" refers to a human subject that is at least about 65 years of age. In some embodiments, the subject may be underweight, normal weight, overweight, or obese. As used herein "underweight" can refer to a subject with a Body Mass Index (BMI) up to about 18.5. As used herein "normal weight" can refer to a subject with a BMI of about 18.5 to about 25. As used herein "overweight" can refer to a subject with a BMI of about 25 to about 30. As used herein "obese" can refer to a subject with a BMI no less than about 30. In other embodiments, the subject may be healthy.

In various embodiments, a subject may engage in one or more types of exercise. In other aspects, a subject may engage in one or more endurance (aerobic) exercises, one or more resistance (strength) exercises, one or more flexibility exercises, one or more balance exercises, or a combination thereof. Non-limiting examples of endurance exercises include jogging, cycling, swimming, and walking. Non-limiting examples of resistance exercises include lifting free weight, use of resistance equipment, use of a subjects own body weight at resistance. Non-limiting examples of flexibility exercises include yoga and stretching parts of the body. Non-limiting examples of balance exercises include tai chi, heel-to-toe walking, and standing on one foot. In preferred embodiments, a subject may perform one or more endurance exercises, one or more resistance exercises, or a combination thereof.

In other various embodiments, a subject may perform one or more types of exercise at least once a day, at least once a day for about 2 days, at least once a day for about 3 days, at least once a day for about 4 days, at least once a day for about 5 days, at least once a day for about 6 days, at least once a day for about 1 week, at least once a day for about 2 weeks, at least once a day for about 3 weeks, at least once a day for about 4 weeks, at least once a day for about 8 weeks, at least once a day for about 12 weeks, at least once a day for about 16 weeks, at least once a day for about 24 weeks, at least once a day for about 52 weeks and thereafter. In other embodiments, a subject may perform one or more types of exercise at least once every other day, at least once every other day for about 2 days, at least once every other day for about 3 days, at least once every other day for about 4 days, at least once every other day for about 5 days, at least once every other day for about 6 days, at least once every other day for about 1 week, at least once every other day for about 2 weeks, at least once every other day for about 3 weeks, at least once every other day for about 4 weeks, at least once every other day for about 8 weeks, at least once every other day for about 12 weeks, at least once every other day for about 16 weeks, at least once every other day for about 24 weeks, at least once every other day for about 52 weeks and thereafter. In still other embodiments, a subject may perform one or more types of exercise at least once every 3 days, at least once every 3 days for about 6 days, at least once every 3 days for about 1 week, at least once every 3 days for about 2 weeks, at least once every 3 days for about 3 weeks, at least once every 3 days for about 4 weeks, at least once every 3 days for about 8 weeks, at least once every 3 days for about 12 weeks, at least once every 3 days for about 16 weeks, at least once every 3 days for about 24 weeks, at least once every 3 days for 52 weeks and thereafter. In still yet other embodiments, a subject may perform one or more types of exercise at least once a week, at least once a week for about 2 weeks, at least once a week for about 3 weeks, at least once a week for about 4 weeks, at least once a week for about 8 weeks, at least once a week for about 12 weeks, at least once a week for about 16 weeks, at least once a week for about 24 weeks, at least once a week for about 52 weeks and thereafter.

(a) Increasing Muscle Protein Synthesis

In various embodiments, compositions disclosed herein comprise a formulation effective for increasing muscle protein synthesis. As used herein, "muscle protein synthesis" refers to the molecular mechanisms within the muscle cell responsible for the creation of new muscle proteins. In various embodiments, compositions disclosed herein comprise a formulation effective for increasing muscle protein synthesis in a subject before exercise, during exercise, after exercise, or a combination thereof. In some aspects, increasing muscle protein synthesis following administration of a composition disclosed herein occurs in a dose dependent manner.

In some embodiments, compositions disclosed herein comprise a formulation effective for increasing muscle protein synthesis in a subject wherein the formulation is administered while subject performs one or more types of exercise, before subject performs one or more types of exercise, or after subject performs one or more types of exercise. In some embodiments, compositions disclosed herein comprise a formulation effective for increasing muscle protein synthesis by at least 20%, at least 25%, at least 30%, at least 35%, at least 40%, at least 45%, or at least 50% in a subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In other embodiments, compositions disclosed herein comprise a formulation effective for increasing muscle protein synthesis in a young subject, a middle-aged subject, or an elderly subject wherein the formulation is administered while subject performs one or more types of exercise, before subject performs one or more types of exercise, or after subject performs one or more types of exercise. In some embodiments, compositions disclosed herein comprise a formulation effective for increasing muscle protein synthesis by at least 20%, at least 25%, at least 30%, at least 35%, at least 40%, at least 45%, or at least 50% in a young subject, a middle-aged subject, or an elderly subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In other embodiments, compositions disclosed herein comprise a formulation effective for increasing muscle protein synthesis in an underweight subject, a normal-weight subject, an overweight subject, or an obese subject wherein the formulation is administered while subject performs one or more types of exercise, before subject performs one or more types of exercise, or after subject performs one or more types of exercise. In some embodiments, compositions disclosed herein comprise a formulation effective for increasing muscle protein synthesis by at least 20%, at least 25%, at least 30%, at least 35%, at least 40%, at least 45%, or at least 50% in an underweight subject, a normal-weight subject, an overweight subject, or an obese subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In yet other embodiments, compositions disclosed herein comprise a formulation effective for increasing muscle protein synthesis by at least 20%, at least 25%, at least 30%, at least 35%, at least 40%, at least 45%, or at least 50% in a subject wherein the formulation is administered wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise wherein the subject has one or more conditions such as cardiovascular disease, hypertension, osteoporosis, diabetes, metabolic disorder, or cancer.

(b) Enhancing Exercise Performance

In some embodiments, compositions disclosed herein comprise a formulation effective for enhancing exercise performance. As used herein, "exercise performance" refers to attaining improved physical performance from engaging in particular types and frequencies of exercise. As used herein, "physical performance" refers to the physical fitness of the subject, measured time to exhaustion in a given bout of exercise, speed of covering a set distance, amount of weight lifted, and/or the like. This encompasses cardiovascular fitness, body composition fitness and the overall condition of subject's musculature as well as athletic ability. "Body composition" as used herein refers to the percentages of fat, muscle, water and bone in a subject's body. "Athletic ability" as used herein refers to the success level of performing physical tasks e.g. running fast, jumping high, running for a long time, lifting heavy weights. In various embodiments, compositions disclosed herein comprise a formulation effective for enhancing exercise performance in a subject when the formulation is consumed before exercise, during exercise, or a combination thereof. In some aspects, for enhancing exercise performance following administration of a composition disclosed herein occurs in a dose dependent manner.

In some embodiments, compositions disclosed herein comprise a formulation effective for enhancing exercise performance in a subject wherein the formulation is administered while subject performs one or more types of exercise, before subject performs one or more types of exercise, or after subject performs one or more types of exercise. In some embodiments, compositions disclosed herein comprise a formulation effective for enhancing exercise performance by at least 5%, at least 10%, at least 15%, at least 20%, at least 25%, at least 30%, at least 35%, at least 40%, at least 45%, or at least 50% in a subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In other embodiments, compositions disclosed herein comprise a formulation effective for enhancing exercise performance in a young subject, a middle-aged subject, or an elderly subject wherein the formulation is administered while subject performs one or more types of exercise, before subject performs one or more types of exercise, or after subject performs one or more types of exercise. In some embodiments, compositions disclosed herein comprise a formulation effective for enhancing exercise performance by at least 5%, at least 10%, at least 15%, at least 20%, at least 25%, at least 30%, at least 35%, at least 40%, at least 45%, or at least 50% in a young subject, a middle-aged subject, or an elderly subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, and/or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In other embodiments, compositions disclosed herein comprise a formulation effective for enhancing exercise performance in an underweight subject, a normal-weight subject, an overweight subject, or an obese subject wherein the formulation is administered while subject performs one or more types of exercise, before subject performs one or more types of exercise, and/or after subject performs one or more types of exercise. In some embodiments, compositions disclosed herein comprise a formulation effective for enhancing exercise performance by at least 5%, at least 10%, at least 15%, at least 20%, at least 25%, at least 30%, at least 35%, at least 40%, at least 45%, or at least 50% in an underweight subject, a normal-weight subject, an overweight subject, or an obese subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, and/or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In yet other embodiments, compositions disclosed herein comprise a formulation effective for enhancing exercise performance by at least 5%, at least 10%, at least 15%, at least 20%, at least 25%, at least 30%, at least 35%, at least 40%, at least 45%, or at least 50% in a subject wherein the formulation is administered wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, and/or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise wherein the subject has one or more conditions such as cardiovascular disease, hypertension, osteoporosis, diabetes, metabolic disorder, or cancer.

(c) Increasing Muscle Blood Flow During Exercise

In some embodiments, compositions disclosed herein comprise a formulation effective for increasing muscle blood flow during exercise. In various embodiments, compositions disclosed herein comprise a formulation effective for increasing muscle blood flow in a subject during exercise, after exercise, or a combination thereof. In some aspects, increasing muscle blood flow during exercise following administration of a composition disclosed herein occurs in a dose dependent manner.

In some embodiments, compositions disclosed herein comprise a formulation effective for increasing muscle blood flow during exercise in a subject wherein the formulation is administered while subject performs one or more types of exercise, before subject performs one or more types of exercise, or after subject performs one or more types of exercise. In some embodiments, compositions disclosed herein comprise a formulation effective for increasing muscle blood flow during exercise by at least 5%, at least 10%, at least 15%, at least 20%, at least 25%, at least 30%, at least 35%, at least 40%, at least 45%, or at least 50% in a subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise In other embodiments, compositions disclosed herein comprise a formulation effective for increasing muscle blood flow during exercise in a young subject, a middle-aged subject, or an elderly subject wherein the formulation is administered while subject performs one or more types of exercise, before subject performs one or more types of exercise, or after subject performs one or more types of exercise. In some embodiments, compositions disclosed herein comprise a formulation effective for increasing muscle blood flow during exercise by at least 5%, at least 10%, at least 15%, at least 20%, at least 25%, at least 30%, at least 35%, at least 40%, at least 45%, or at least 50% in a young subject, a middle-aged subject, or an elderly subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In other embodiments, compositions disclosed herein comprise a formulation effective for increasing muscle blood flow during exercise in an underweight subject, a normal-weight subject, an overweight subject, or an obese subject wherein the formulation is administered while subject performs one or more types of exercise, before subject performs one or more types of exercise, or after subject performs one or more types of exercise. In some embodiments, compositions disclosed herein comprise a formulation effective for increasing muscle blood flow during exercise by at least 5%, at least 10%, at least 15%, at least 20%, at least 25%, at least 30%, at least 35%, at least 40%, at least 45%, or at least 50% in an underweight subject, a normal-weight subject, an overweight subject, or an obese subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In yet other embodiments, compositions disclosed herein comprise a formulation effective for increasing muscle blood flow during exercise by at least 5%, at least 10%, at least 15%, at least 20%, at least 25%, at least 30%, at least 35%, at least 40%, at least 45%, or at least 50% in a subject wherein the formulation is administered wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise wherein the subject has one or more conditions such as cardiovascular disease, hypertension, osteoporosis, diabetes, metabolic disorder, or cancer.

(d) Decreasing Perception of Fatigue During Exercise

In some embodiments, compositions disclosed herein comprise a formulation effective for decreasing perception of fatigue during exercise. As used herein, "perception of fatigue during exercise" refers to a state in which a subject perceives that the body cannot continue an exercise regimen and/or cannot maintain predetermined exercise intensity when physical capacity of the subject is not limited by an exercise load. In various embodiments, compositions disclosed herein comprise a formulation effective for decreasing perception of fatigue in a subject during exercise, after exercise, or a combination thereof. In some aspects, decreasing perception of fatigue during exercise following administration of a composition disclosed herein occurs in a dose dependent manner.

In some embodiments, compositions disclosed herein comprise a formulation effective for decreasing perception of fatigue during exercise in a subject wherein the formulation is administered while subject performs one or more types of exercise, before subject performs one or more types of exercise, or after subject performs one or more types of exercise. In some embodiments, compositions disclosed herein comprise a formulation effective for decreasing perception of fatigue during exercise by at least 5%, at least 10%, at least 15%, at least 20%, at least 25%, at least 30%, at least 35%, at least 40%, at least 45%, or at least 50% in a subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In other embodiments, compositions disclosed herein comprise a formulation effective for decreasing perception of fatigue during exercise in a young subject, a middle-aged subject, or an elderly subject wherein the formulation is administered while subject performs one or more types of exercise, before subject performs one or more types of exercise, or after subject performs one or more types of exercise. In some embodiments, compositions disclosed herein comprise a formulation effective for decreasing perception of fatigue during exercise by at least 5%, at least 10%, at least 15%, at least 20%, at least 25%, at least 30%, at least 35%, at least 40%, at least 45%, or at least 50% in a young subject, a middle-aged subject, or an elderly subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In other embodiments, compositions disclosed herein comprise a formulation effective for decreasing perception of fatigue during exercise in an underweight subject, a normal-weight subject, an overweight subject, or an obese subject wherein the formulation is administered while subject performs one or more types of exercise, before subject performs one or more types of exercise, or after subject performs one or more types of exercise. In some embodiments, compositions disclosed herein comprise a formulation effective for decreasing perception of fatigue during exercise by at least 5%, at least 10%, at least 15%, at least 20%, at least 25%, at least 30%, at least 35%, at least 40%, at least 45%, or at least 50% in an underweight subject, a normal-weight subject, an overweight subject, or an obese subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In yet other embodiments, compositions disclosed herein comprise a formulation effective for decreasing perception of fatigue during exercise by at least 5%, at least 10%, at least 15%, at least 20%, at least 25%, at least 30%, at least 35%, at least 40%, at least 45%, or at least 50% in a subject wherein the formulation is administered wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise wherein the subject has one or more conditions such as cardiovascular disease, hypertension, osteoporosis, diabetes, metabolic disorder, or cancer.

(e) Providing Energy for Rapid Bursts of Exertion During Exercise

In some embodiments, compositions disclosed herein comprise a formulation effective for providing energy during exercise. As used herein, "providing energy" refers to replenishing energy used by a subject during exercise. As used herein, the "energy" used during exercise refers to adenosine triphosphate (ATP) that has been produced by mitochondria in muscle cells or creatine phosphate that has been produced in muscle cells. In various embodiments, compositions disclosed herein comprise a formulation effective for providing energy to a subject during exercise, after exercise, or a combination thereof. In some aspects, providing energy to a subject during exercise following administration of a composition disclosed herein occurs in a dose dependent manner. In other aspects, compositions disclosed herein comprise a formulation effective for providing energy for rapids bursts of exertion during exercise.

In some embodiments, compositions disclosed herein comprise a formulation effective for providing energy for rapids bursts of exertion during exercise in a subject wherein the formulation is administered while subject performs one or more types of exercise, before subject performs one or more types of exercise, or after subject performs one or more types of exercise. In some embodiments, compositions disclosed herein comprise a formulation effective for providing energy for rapids bursts of exertion during exercise by at least 5%, at least 10%, at least 15%, at least 20%, at least 25%, at least 30%, at least 35%, at least 40%, at least 45%, or at least 50% in a subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise In other embodiments, compositions disclosed herein comprise a formulation effective for providing energy for rapids bursts of exertion during exercise in a young subject, a middle-aged subject, or an elderly subject wherein the formulation is administered while subject performs one or more types of exercise, before subject performs one or more types of exercise, or after subject performs one or more types of exercise. In some embodiments, compositions disclosed herein comprise a formulation effective for providing energy for rapids bursts of exertion during exercise by at least 5%, at least 10%, at least 15%, at least 20%, at least 25%, at least 30%, at least 35%, at least 40%, at least 45%, or at least 50% in a young subject, a middle-aged subject, or an elderly subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In other embodiments, compositions disclosed herein comprise a formulation effective for providing energy for rapids bursts of exertion during exercise in an underweight subject, a normal-weight subject, an overweight subject, or an obese subject wherein the formulation is administered while subject performs one or more types of exercise, before subject performs one or more types of exercise, or after subject performs one or more types of exercise. In some embodiments, compositions disclosed herein comprise a formulation effective for providing energy for rapids bursts of exertion during exercise by at least 5%, at least 10%, at least 15%, at least 20%, at least 25%, at least 30%, at least 35%, at least 40%, at least 45%, or at least 50% in an underweight subject, a normal-weight subject, an overweight subject, or an obese subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise.

In yet other embodiments, compositions disclosed herein comprise a formulation effective for providing energy for rapids bursts of exertion during exercise by at least 5%, at least 10%, at least 15%, at least 20%, at least 25%, at least 30%, at least 35%, at least 40%, at least 45%, or at least 50% in a subject wherein the formulation is administered wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise wherein the subject has one or more conditions such as cardiovascular disease, hypertension, osteoporosis, diabetes, metabolic disorder, or cancer.

(f) Maintaining and/or Correcting Electrolyte Balance During Exercise

In various embodiments, compositions disclosed herein comprise a formulation effective for correcting electrolyte balance during exercise. In other embodiments, compositions disclosed herein comprise a formulation effective for maintaining adequate electrolyte balance during exercise. As used herein, "adequate electrolyte balance" refers to the concentrations of ionized solutes in a subject's body fluids required to maintain physiological functions. As used herein, administration of compositions disclosed herein may maintain and/or correct any exercise-induced disturbances of a subject's electrolyte balance. In various embodiments, compositions disclosed herein comprise a formulation effective for maintaining and/or correcting electrolyte balance in a subject during exercise, after exercise, or a combination thereof. In some aspects, a subject may engage in one or more types of exercise. In some aspects, maintaining and/or correcting electrolyte balance in a subject during exercise following administration of a composition disclosed herein occurs in a dose dependent manner.

In some embodiments, compositions disclosed herein comprise a formulation effective maintaining and/or correcting electrolyte balance during exercise in a subject wherein the formulation is administered while subject performs one or more types of exercise, before subject performs one or more types of exercise, or after subject performs one or more types of exercise. In some embodiments, compositions disclosed herein comprise a formulation effective for maintaining and/or correcting electrolyte balance during exercise by at least 5%, at least 10%, at least 15%, at least 20%, at least 25%, at least 30%, at least 35%, at least 40%, at least 45%, or at least 50% in a subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In other embodiments, compositions disclosed herein comprise a formulation effective maintaining and/or correcting electrolyte balance during exercise in a young subject, a middle-aged subject, or an elderly subject wherein the formulation is administered while subject performs one or more types of exercise, before subject performs one or more types of exercise, or after subject performs one or more types of exercise. In some embodiments, compositions disclosed herein comprise a formulation effective for maintaining and/or correcting electrolyte balance during exercise by at least 5%, at least 10%, at least 15%, at least 20%, at least 25%, at least 30%, at least 35%, at least 40%, at least 45%, or at least 50% in a young subject, a middle-aged subject, or an elderly subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In other embodiments, compositions disclosed herein comprise a formulation effective for maintaining and/or correcting electrolyte balance during exercise in an underweight subject, a normal-weight subject, an overweight subject, or an obese subject wherein the formulation is administered while subject performs one or more types of exercise, before subject performs one or more types of exercise, or after subject performs one or more types of exercise. In some embodiments, compositions disclosed herein comprise a formulation effective for maintaining and/or correcting electrolyte balance in a subject during exercise by at least 5%, at least 10%, at least 15%, at least 20%, at least 25%, at least 30%, at least 35%, at least 40%, at least 45%, or at least 50% in an underweight subject, a normal-weight subject, an overweight subject, or an obese subject wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise.

In yet other embodiments, compositions disclosed herein comprise a formulation effective for maintaining and/or correcting electrolyte balance during exercise by at least 5%, at least 10%, at least 15%, at least 20%, at least 25%, at least 30%, at least 35%, at least 40%, at least 45%, or at least 50% in a subject wherein the formulation is administered wherein the formulation is administered while subject performs one or more types of exercise, the formulation is administered up to 1 minute, up to 5 minutes, up to 10 minutes, up to 15 minutes, up to 20 minutes, up to 30 minutes, up to 45 minutes, or up to 1 hour before the subject performs one or more types of exercise, or the formulation is administered up to 1 minute, up to 5 minutes, up to 10 minutes, up to 15 minutes, up to 20 minutes, up to 30 minutes, up to 45 minutes, or up to 1 hour after the subject performs one or more types of exercise wherein the subject has one or more conditions such as cardiovascular disease, hypertension, osteoporosis, diabetes, metabolic disorder, or cancer.

(III) Kits and Packaging of Compositions

In various embodiments, the present disclosure provides a kit comprising at least one or more compositions disclosed herein. In other embodiments, the present disclosure provides packaging comprising at least one or more compositions disclosed herein.

(a) Kits

The present disclosure may further comprise a kit, wherein the kit comprises at least a composition as described herein. In various embodiments, a kit may further comprise one or more additional compositions, instructions for applying the composition(s), instructions for complying with a suitable application regimen, an implement, a substrate, a delivery enhancement device, a dietary supplement, or combinations thereof. In some aspects, a kit may comprise an outer packaging unit, which in turn may comprise one or more smaller, inner packaging units. In further aspects, inner packaging units may comprise one or more of individual components of the kit. In other aspects, inner and outer packaging units may be of any type suitable for containing, presenting and/or reasonably protecting from damage the contents of the kit. In still other aspects, inner packaging units may contain a quantity of a composition suitable for at least one dose, at least two doses, at least three doses, at least four doses, at least 5 doses, at least 6 doses, at least 7 doses, at least 8 doses, at least 9 doses, at least 10 doses, at least 11 doses, or at least 12 doses. In additional aspects, a kit may comprise one or more containers wherein the containers may be filled with one or more of the ingredients of a composition disclosed herein. In a non-limiting example, the kit can comprise a powdered drink mix and a composition disclosed herein.

In various embodiments, a kit may further comprise instructions for methods of use. In some aspects, instructions to be provided with a kit may be in a fixed form. Non-limiting examples of fixed form instructions include written, recorded onto an audiocassette, videocassette, compact disc, or digital videodisc. In other aspects, a kit may comprise a notice in the form prescribed by a government agency regulating the manufacture, use or sale of pharmaceutical products, which notice reflects approval by the agency of manufacture, use of sale for human administration. In still other aspects, a kit may be labeled with information regarding mode of administration, sequence of administration, or the like. In other aspects, a kit may include means for reminding the subject to administer a composition. In other embodiments, a kit may further comprise a virtual package. As used herein, a "virtual package" refers to components of a kit that are associated by directions on one or more physical or virtual kit components instructing the user how to obtain the other components. A non-limiting example of a virtual package includes a bag or other container containing one component and directions instructing a subject to go to a website, contact a recorded message or a fax-back service, view a visual message, or contact a caregiver or instructor to obtain instructions on how to use the kit or safety or technical information about one or more components of a kit.

In other embodiments, a kit may be a single package. As used herein, the term "single package" means that the components of a kit are physically associated in or with one or more containers and considered a unit for manufacture, distribution, sale, or use. Examples of containers include, but are not limited to, bags, boxes, cartons, bottles, packages such as shrink-wrap packages, stapled or otherwise affixed components, or combinations thereof. In some aspects, a single package may comprise containers of compositions disclosed herein and food products physically associated such that they are considered a unit for manufacture, distribution, sale, or use.

In some embodiments, a kit may comprise one or more components to assist administration of a composition described herein. Non-limiting examples of such components include syringes, measuring spoons or cups, spoons, and straws. In other embodiments, a kit may comprise a composition as disclosed herein and a food product wherein the composition may be incorporated into a food product. In an aspect, a food product for use herein may be a drink. Non-limiting examples of a suitable drink include fruit juice, a fruit drink, an artificially flavored drink, an artificially sweetened drink, a carbonated beverage, a sports drink, and so forth. In another aspect, the food product may also be a solid foodstuff. Suitable examples of a solid foodstuff include a food bar, a snack bar, a cookie, a brownie, a muffin, a cracker, and the like.

(b) Packaging

In various embodiments, compositions disclosed herein may be packaged. In some aspects, packaging of a composition may be for storage, shipment, display for sale, or a combination thereof. In various aspects, compositions may be packaged using one or more suitable materials known in the art. In other aspects, compositions may be packaged using one or more suitable methods known in the art. In some aspects, the choice of packaging material and/or packaging method is dependent on the dosage form of a composition disclosed herein to be packaged.

In some embodiments, compositions disclosed herein may be packaged wherein packaging increases the length of time a composition can be stored. As used herein, the "shelf-life" of a composition is the length of time after formulation that a composition can maintain one or more physiological effects following administration to a subject as detailed herein. In some aspects, compositions disclosed herein may be packaged wherein packaging increases the shelf-life of a composition by about 1 week, about 1 month, about 6 month, about 1 year, about 2 years, about 3 years, or about 4 years after formulation. In other embodiments, compositions disclosed herein may be packaged wherein packaging increases the length of time a composition can be stored at room temperature. As used herein, room temperature may be about 20° C. to about 25° C. In some aspects, compositions disclosed herein may be packaged wherein packaging increases the length of time a composition can be stored at room temperature by about 1 week, about 1 month, about 6 month, about 1 year, about 2 years, about 3 years, or about 4 years.

In other embodiments, compositions disclosed herein may be packaged wherein the packaging allows for the packaged composition to be frozen. In some aspects, the packaging allows for the packaged composition to be frozen for about 1 week, about 1 month, about 6 month, about 1 year, about 2 years, about 3 years, or about 4 years. In still other embodiments, compositions disclosed herein may be packaged wherein the packaging allows for the packaged composition to be heated. In some aspects, the packaging allows for the packaged composition to be cooked.

(IV) Methods of Using Compositions

Other aspects of the present invention are methods of administering a composition disclosed herein to a subject wherein administration increases muscle protein synthesis, enhances exercise performance, increases muscle blood flow during exercise, decreases perception of fatigue during exercise, provides energy for rapids bursts of exertion during exercise, or maintains and/or corrects adequate electrolyte balance during exercise.

(a) Methods of Administration

In various embodiments, methods of administration of a composition may include administration of a liquid composition to increase muscle protein synthesis in a subject. In various embodiments, compositions disclosed herein may be a liquid dosage form. Non-limiting examples of suitable liquid dosage forms include solutions or suspensions in water, pharmaceutically acceptable fats and oils, alcohols or other organic solvents, including esters, emulsions, syrups or elixirs, suspensions, solutions and/or suspensions reconstituted from non-effervescent granules and effervescent preparations reconstituted from effervescent granules. In other embodiments, administration of a composition may include a solid dosage form to increase muscle protein synthesis in a subject. In yet other embodiments, methods of administration of a composition may include administration of a solid dosage form of a composition disclosed herein may be a tablet, a capsule, a granule or a powder. In still other embodiments, a solid dosage composition may be incorporated into a food product. In other embodiments, a solid dosage composition may be incorporated into a food product. In an aspect, a food product for use herein may be a drink. Non-limiting examples of a suitable drink include fruit juice, a fruit drink, an artificially flavored drink, an artificially sweetened drink, a carbonated beverage, a sports drink, and so forth. In another aspect, the food product may also be a solid foodstuff. Suitable examples of a solid foodstuff include a food bar, a snack bar, a cookie, a brownie, a muffin, a cracker, and the like.

In various embodiments, administration of a composition disclosed herein may be administered to a subject before the subject engages in one or more types of exercise, while the subject engages in one or more types of exercise, or after the subject has engaged in one or more types of exercise. In some aspects, a composition may be administered up to 1 minute, up to 5 minutes, up to 10 minutes, up to 15 minutes, up to 20 minutes, up to 30 minutes, up to 45 minutes, or up to 1 hour before a subject may engages in one or more types of exercise, or up to 1 minute, up to 5 minutes, up to 10 minutes, up to 15 minutes, up to 20 minutes, up to 30 minutes, up to 45 minutes, or up to 1 hour after a subject has engaged in one or more types of exercise. In other aspects, a composition may be administered immediately before a subject engages in one or more types of exercise. In still other aspects, a composition may be administered at least once, at least twice, or at least three times before the subject engages in one or more types of exercise. In still other aspects, a composition may be administered immediately after a subject has engaged in one or more types of exercise. In still other aspects, a composition may be administered at least once, at least twice, or at least three times after a subject has engaged in one or more types of exercise. In other aspects, a composition may be administered at any point during which a subject is engaged in one or more types of exercise.

In various embodiments, administration of a composition disclosed herein may be administered to a subject about once a day, about twice a day, about three times a day. In other embodiments, administration of a composition disclosed herein may be administered to a subject at least once a day, at least once a day for about 2 days, at least once a day for about 3 days, at least once a day for about 4 days, at least once a day for about 5 days, at least once a day for about 6 days, at least once a day for about 1 week, at least once a day for about 2 weeks, at least once a day for about 3 weeks, at least once a day for about 4 weeks, at least once a day for about 8 weeks, at least once a day for about 12 weeks, at least once a day for about 16 weeks, at least once a day for about 24 weeks, at least once a day for about 52 weeks and thereafter. In other embodiments, administration of a composition disclosed herein may be administered to a subject at least once every other day, at least once every other day for about 2 days, at least once every other day for about 3 days, at least once every other day for about 4 days, at least once every other day for about 5 days, at least once every other day for about 6 days, at least once every other day for about 1 week, at least once every other day for about 2 weeks, at least once every other day for about 3 weeks, at least once every other day for about 4 weeks, at least once every other day for about 8 weeks, at least once every other day for about 12 weeks, at least once every other day for about 16 weeks, at least once every other day for about 24 weeks, at least once every other day for about 52 weeks and thereafter. In still other embodiments, administration of a composition disclosed herein may be administered to a subject at least once every 3 days, at least once every 3 days for about 6 days, at least once every 3 days for about 1 week, at least once every 3 days for about 2 weeks, at least once every 3 days for about 3 weeks, at least once every 3 days for about 4 weeks, at least once every 3 days for about 8 weeks, at least once every 3 days for about 12 weeks, at least once every 3 days for about 16 weeks, at least once every 3 days for about 24 weeks, at least once every 3 days for 52 weeks and thereafter. In other embodiments, administration of a composition disclosed herein may be administered to a subject at least once a week, at least once a week for about 2 weeks, at least once a week for about 3 weeks, at least once a week for about 4 weeks, at least once a week for about 8 weeks, at least once a week for about 12 weeks, at least once a week for about 16 weeks, at least once a week for about 24 weeks, at least once a week for about 52 weeks and thereafter.

(b) Methods of Increasing Muscle Protein Synthesis

In various embodiments, a method of increasing muscle protein synthesis may include administration of a composition disclosed herein to a subject. In other embodiments, a method of increasing muscle protein synthesis in a subject during exercise or after exercise may include administration of a composition disclosed herein before exercise, during exercise, after exercise, or a combination thereof. In preferred embodiments, a method of increasing muscle protein synthesis may include oral administration of a composition disclosed herein to a subject before exercise, during exercise, after exercise, or a combination thereof.

In some aspects, administration of at least about 3 grams to about 15 grams of a composition disclosed herein may increase muscle protein synthesis in a subject. In various embodiments, administration of a composition disclosed herein comprising one or more EAAs may increase muscle protein synthesis in a subject. In other aspects, administration of a composition disclosed herein comprising at least about 3 grams to about 15 grams of total EEAs may increase muscle protein synthesis in a subject. In still other aspects, administration of a composition disclosed herein comprising at least 3 grams, at least 4 grams, at least 5 grams, at least 6 grams, at least 7 grams, at least 8 grams, at least 9 grams, at least 10 grams, at least 11 grams, at least 12 grams, at least 13 grams, at least 14 grams, or at least 15 grams of total EEAs may increase muscle protein synthesis in a subject.

In various embodiments, administration of a composition disclosed herein comprising one or more NEAAs may increase muscle protein synthesis in a subject when provided with one or more EAAs. In some aspects, administration of a composition disclosed herein comprising about 0.4 grams to about 4.0 grams total NEAAs may increase muscle protein synthesis in a subject when provided with one or more EAAs. In still other aspects, administration of a composition disclosed herein comprising at least about 0.4 grams, about 0.5 grams, about 0.6 grams, about 0.7 grams, about 0.8 grams, about 0.9 grams, about 1.0 grams, about 1.1 grams, about 1.2 grams, about 1.3 grams, about 1.4 grams, about 1.5 grams, about 1.6 grams, about 1.7 grams, about 1.8 grams, about 1.9 grams, about 2.0 grams, about 2.5 grams, about 3 grams, about 3.5 grams, or about 4.0 grams total NEAAs may increase muscle protein synthesis in a subject.

In various embodiments, administration of a composition disclosed herein comprising at least one or more EAAs and at least one or more NEAAs may increase muscle protein synthesis in a subject. In various embodiments, administration of a composition disclosed herein comprising about 1% NEAAs and about 99% EAAs, about 5% NEAAs and about 95% EAAs, about 10% NEAAs and about 90% EAAs, about 15% NEAAs and about 85% EAAs, or about 20% NEAAs and about 80% EAAs by weight of total weight of the composition may increase muscle protein synthesis in a subject.

In various embodiments, administration of a composition comprising one or more nutrient elements may increase muscle protein synthesis in a subject when combined with one or more EAAs. In other embodiments, administration of a composition comprising caffeine may increase muscle protein synthesis in a subject. In still other embodiments, administration of a composition comprising one or more excipients may increase muscle protein synthesis in a subject.

In some embodiments, administration of a composition disclosed herein to a subject may increase muscle protein synthesis in the subject by at least 20%, at least 25%, at least 30%, at least 35%, at least 40%, at least 45%, or at least 50% compared to exercise alone.

In some embodiments, administration of a composition disclosed herein may increase muscle protein synthesis in a young subject, a middle-aged subject, or an elderly subject by at least 20%, at least 25%, at least 30%, at least 35%, at least 40%, at least 45%, or at least 50% compared to exercise alone.

In some embodiments, administration of a composition disclosed herein may increase muscle protein synthesis in a subject by at least 20%, at least 25%, at least 30%, at least 35%, at least 40%, at least 45%, or at least 50% compared to exercise alone wherein the subject is underweight, normal-weight, over-weight or obese.

In other embodiments, administration of a composition disclosed herein may increase muscle protein synthesis in a subject by at least 20%, at least 25%, at least 30%, at least 35%, at least 40%, at least 45%, or at least 50% compared to exercise alone wherein the subject has one or more conditions selected from the group comprising cardiovascular disease, hypertension, osteoporosis, diabetes, metabolic disorder, and cancer.

(c) Methods of Enhancing Exercise Performance

In various embodiments, a method of enhancing exercise performance may include administration of a composition disclosed herein. In other embodiments, a method of enhancing exercise performance in a subject during exercise may include administration of a composition disclosed herein before exercise, during exercise, or a combination thereof. In preferred embodiments, a method of enhancing exercise performance may include oral administration of a composition disclosed herein before exercise, during exercise, or a combination thereof.

In some aspects, administration of at least about 3 grams to about 15 grams of a composition disclosed herein may enhance exercise performance in a subject. In various embodiments, administration of a composition disclosed herein comprising one or more EAAs may enhance exercise performance in a subject. In other aspects, administration of a composition disclosed herein comprising at least about 3 grams to about 15 grams of total EEAs may enhance exercise performance in a subject. In still other aspects, administration of a composition disclosed herein comprising at least 3 grams, at least 4 grams, at least 5 grams, at least 6 grams, at least 7 grams, at least 8 grams, at least 9 grams, at least 10 grams, at least 11 grams, at least 12 grams, at least 13 grams, at least 14 grams, or at least 15 grams of total EEAs may increase muscle protein synthesis in a subject.

In various embodiments, administration of a composition disclosed herein comprising one or more NEAAs may enhance exercise performance in a subject. In some aspects, administration of a composition disclosed herein comprising about 0.4 grams to about 4.0 grams total NEAAs may enhance exercise performance in a subject. In still other aspects, administration of a composition disclosed herein comprising at least about 0.4 grams, about 0.5 grams, about 0.6 grams, about 0.7 grams, about 0.8 grams, about 0.9 grams, about 1.0 grams, about 1.1 grams, about 1.2 grams, about 1.3 grams, about 1.4 grams, about 1.5 grams, about 1.6 grams, about 1.7 grams, about 1.8 grams, about 1.9 grams, about 2.0 grams, about 2.5 grams, about 3.0 grams, about 3.5 grams, or about 4.0 grams total NEAAs may improve exercise performance in a subject.

In various embodiments, administration of a composition disclosed herein comprising at least one or more EAAs and at least one or more NEAAs may enhance exercise performance in a subject. In various embodiments, administration of a composition disclosed herein comprising about 1% NEAAs and about 99% EAAs, about 5% NEAAs and about 95% EAAs, about 10% NEAAs and about 90% EAAs, about 15% NEAAs and about 85% EAAs, or about 20% NEAAs and about 80% EAAs by weight of total weight of the composition may enhance exercise performance in a subject.

In various embodiments, administration of a composition comprising one or more nutrient elements may enhance exercise performance in a subject. In other embodiments, administration of a composition comprising caffeine may enhance exercise performance in a subject. In still other embodiments, administration of a composition comprising one or more excipients may enhance exercise performance in a subject.

In some embodiments, administration of a composition disclosed herein to a subject may enhance exercise performance in the subject by at least 5%, at least 10%, at least 15%, at least 20%, at least 25%, at least 30%, at least 35%, at least 40%, at least 45%, or at least 50% compared to exercise alone.

In some embodiments, administration of a composition disclosed herein may enhance exercise performance in a young subject, a middle-aged subject, or an elderly subject by at least 5%, at least 10%, at least 15%, at least 20%, at least 25%, at least 30%, at least 35%, at least 40%, at least 45%, or at least 50% compared to exercise alone.

In some embodiments, administration of a composition disclosed herein may enhance exercise performance in a subject by at least 5%, at least 10%, at least 15%, at least 20%, at least 25%, at least 30%, at least 35%, at least 40%, at least 45%, or at least 50% compared to exercise alone wherein the subject is underweight, normal-weight, over-weight or obese.

In other embodiments, administration of a composition disclosed herein may enhance exercise performance in a subject by at least 5%, at least 10%, at least 15%, at least 20%, at least 25%, at least 30%, at least 35%, at least 40%, at least 45%, or at least 50% compared to exercise alone wherein the subject has one or more conditions selected from the group comprising cardiovascular disease, hypertension, osteoporosis, diabetes, metabolic disorder, and cancer.

(d) Methods of Increasing Muscle Blood Flow During Exercise

In various embodiments, a method of increasing muscle blood flow may include administration of a composition disclosed herein. In other embodiments, a method of increasing muscle blood flow in a subject during exercise may include administration of a composition disclosed herein before exercise, during exercise, or a combination thereof. In preferred embodiments, a method of increasing muscle blood flow may include oral administration of a composition disclosed herein before exercise, during exercise, or a combination thereof.

In some aspects, administration of at least about 3 grams to about 15 grams of a composition disclosed herein may increase muscle blood flow in a subject. In various embodiments, administration of a composition disclosed herein comprising one or more EAAs may increase muscle blood flow in a subject. In other aspects, administration of a composition disclosed herein comprising at least about 3 grams to about 15 grams of total EEAs plus citrulline may increase muscle blood flow in a subject. In still other aspects, administration of a composition disclosed herein comprising at least 3 grams, at least 4 grams, at least 5 grams, at least 6 grams, at least 7 grams, at least 8 grams, at least 9 grams, at least 10 grams, at least 11 grams, at least 12 grams, at least 13 grams, at least 14 grams r at least 15 grams of total EEAs plus citrulline may increase muscle blood flow in a subject.

In various embodiments, administration of a composition disclosed herein comprising one or more NEAAs may increase muscle blood flow in a subject. In some aspects, administration of a composition disclosed herein comprising about 0.4 grams to about 4.0 grams total NEAAs may increase muscle blood flow in a subject. In still other aspects, administration of a composition disclosed herein comprising at least about 0.4 grams, about 0.5 grams, about 0.6 grams, about 0.7 grams, about 0.8 grams, about 0.9 grams, about 1.0 grams, about 1.1 grams, about 1.2 grams, about 1.3 grams, about 1.4 grams, about 1.5 grams, about 1.6 grams, about 1.7 grams, about 1.8 grams, about 1.9 grams, about 2.0 grams, about 2/5 grams, about 3.0 grams, about 3.5 grams, or about 4.0 grams total NEAAs may increase muscle blood flow in a subject.

In various embodiments, administration of a composition disclosed herein comprising at least one or more EAAs and at least one or more NEAAs may increase muscle blood flow in a subject. In various embodiments, administration of a composition disclosed herein comprising about 1% NEAAs and about 99% EAAs, about 5% NEAAs and about 95% EAAs, about 10% NEAAs and about 90% EAAs, about 15% NEAAs and about 85% EAAs, or about 20% NEAAs and about 80% EAAs by weight of total weight of the composition may increase muscle blood flow in a subject.

In various embodiments, administration of a composition comprising one or more nutrient elements may increase muscle blood flow in a subject. In other embodiments, administration of a composition comprising citrulline may increase muscle blood flow in a subject. In still other embodiments, administration of a composition comprising one or more excipients may increase muscle blood flow in a subject.

In some embodiments, administration of a composition disclosed herein to a subject may increase muscle blood flow in the subject by at least 5%, at least 10%, at least 15%, at least 20%, at least 25%, at least 30%, at least 35%, at least 40%, at least 45%, or at least 50% compared to exercise alone.

In some embodiments, administration of a composition disclosed herein may increase muscle blood flow in a young subject, a middle-aged subject, or an elderly subject by at least 5%, at least 10%, at least 15%, at least 20%, at least 25%, at least 30%, at least 35%, at least 40%, at least 45%, or at least 50% compared to exercise alone.

In some embodiments, administration of a composition disclosed herein may increase muscle blood flow in a subject by at least 5%, at least 10%, at least 15%, at least 20%, at least 25%, at least 30%, at least 35%, at least 40%, at least 45%, or at least 50% compared to exercise alone wherein the subject is underweight, normal-weight, over-weight or obese.

In other embodiments, administration of a composition disclosed herein may increase muscle blood flow in a subject by at least 5%, at least 10%, at least 15%, at least 20%, at least 25%, at least 30%, at least 35%, at least 40%, at least 45%, or at least 50% compared to exercise alone wherein the subject has one or more conditions selected from the group comprising cardiovascular disease, hypertension, osteoporosis, diabetes, metabolic disorder, and cancer.

(e) Methods of Decreasing Perception of Fatigue During Exercise

In various embodiments, a method of decreasing perception of fatigue during exercise may include administration of a composition disclosed herein. In other embodiments, a method of decreasing perception of fatigue in a subject during or after exercise may include administration of a composition disclosed herein before exercise, during exercise, after exercise, or a combination thereof. In preferred embodiments, a method of decreasing perception of fatigue during or after exercise may include oral administration of a composition disclosed herein before exercise, during exercise, after exercise or a combination thereof.

In some aspects, administration of at least about 3 grams to about 15 grams of a composition disclosed herein may decrease perception of fatigue in a subject. In various embodiments, administration of a composition disclosed herein comprising one or more EAAs may decrease perception of fatigue in a subject. In other aspects, administration of a composition disclosed herein comprising at least about 3 grams to about 15 grams of total EEAs may decrease perception of fatigue in a subject. In still other aspects, administration of a composition disclosed herein comprising at least 3 grams, at least 4 grams, at least 5 grams, at least 6 grams, at least 7 grams, at least 8 grams, at least 9 grams, at least 10 grams, at least 11 grams, at least 12 grams, at least 13 grams, at least 14 grams, or at least 15 grams of total EEAs may decrease perception of fatigue in a subject.

In various embodiments, administration of a composition disclosed herein comprising one or more NEAAs may decrease perception of fatigue in a subject. In some aspects, administration of a composition disclosed herein comprising about 0.4 grams to about 4.0 grams total NEAAs may decrease perception of fatigue in a subject. In still other aspects, administration of a composition disclosed herein comprising at least about 0.4 grams, about 0.5 grams, about 0.6 grams, about 0.7 grams, about 0.8 grams, about 0.9 grams, about 1.0 grams, about 1.1 grams, about 1.2 grams, about 1.3 grams, about 1.4 grams, about 1.5 grams, about 1.6 grams, about 1.7 grams, about 1.8 grams, about 1.9 grams, about 2.0 grams, about 2.5 grams, about 3.0 grams, about 3.5 grams, or about 4.0 grams total NEAAs may decrease perception of fatigue in a subject.

In various embodiments, administration of a composition disclosed herein comprising at least one or more EAAs and at least one or more NEAAs may decrease perception of fatigue in a subject. In various embodiments, administration of a composition disclosed herein comprising about 1% NEAAs and about 99% EAAs, about 5% NEAAs and about 95% EAAs, about 10% NEAAs and about 90% EAAs, about 15% NEAAs and about 85% EAAs, or about 20% NEAAs and about 80% EAAs by weight of total weight of the composition may decrease perception of fatigue in a subject.

In various embodiments, administration of a composition comprising one or more nutrient elements may decrease perception of fatigue in a subject. In other embodiments, administration of a composition comprising caffeine may decrease perception of fatigue in a subject. In still other embodiments, administration of a composition comprising one or more excipients may decrease perception of fatigue in a subject.

In some embodiments, administration of a composition disclosed herein to a subject may decrease perception of fatigue during exercise in the subject by at least 5%, at least 10%, at least 15%, at least 20%, at least 25%, at least 30%, at least 35%, at least 40%, at least 45%, or at least 50% compared to exercise alone.

In some embodiments, administration of a composition disclosed herein may decrease perception of fatigue during exercise in a young subject, a middle-aged subject, or an elderly subject by at least 5%, at least 10%, at least 15%, at least 20%, at least 25%, at least 30%, at least 35%, at least 40%, at least 45%, or at least 50% compared to exercise alone.

In some embodiments, administration of a composition disclosed herein may decrease perception of fatigue during exercise in a subject by at least 5%, at least 10%, at least 15%, at least 20%, at least 25%, at least 30%, at least 35%, at least 40%, at least 45%, or at least 50% compared to exercise alone wherein the subject is underweight, normal-weight, over-weight or obese.

In other embodiments, administration of a composition disclosed herein may decrease perception of fatigue during exercise in a subject by at least 5%, at least 10%, at least 15%, at least 20%, at least 25%, at least 30%, at least 35%, at least 40%, at least 45%, or at least 50% compared to exercise alone wherein the subject has one or more conditions selected from the group comprising cardiovascular disease, hypertension, osteoporosis, diabetes, metabolic disorder, and cancer.

(f) Methods of Providing Energy for Rapid Bursts of Exertion During Exercise

In various embodiments, a method of providing energy for rapid bursts of exertion during exercise may include administration of a composition disclosed herein. In other embodiments, a method of providing energy for rapid bursts of exertion in a subject during exercise may include administration of a composition disclosed herein before exercise, during exercise, or a combination thereof. In preferred embodiments, a method of providing energy for rapid bursts of exertion during exercise may include oral administration of a composition disclosed herein before exercise, during exercise, or a combination thereof.

In some aspects, administration of at least about 3 grams to about 15 grams of a composition disclosed herein may provide energy for rapid bursts of exertion in a subject. In various embodiments, administration of a composition disclosed herein comprising one or more EAAs may provide energy for rapid bursts of exertion in a subject. In other aspects, administration of a composition disclosed herein comprising at least about 3 grams to about 15 grams of total EEAs may provide energy for rapid bursts of exertion in a subject. In still other aspects, administration of a composition disclosed herein comprising at least 3 grams, at least 4 grams, at least 5 grams, at least 6 grams, at least 7 grams, at least 8 grams, at least 9 grams, at least 10 grams, at least 11 grams, at least 12 grams, at least 13 grams at least 14 grams, or at least 15 grams of total EEAs may provide energy for rapid bursts of exertion in a subject.

In various embodiments, administration of a composition disclosed herein comprising one or more NEAAs may provide energy for rapid bursts of exertion in a subject. In some aspects, administration of a composition disclosed herein comprising about 0.4 grams to about 4.0 grams total NEAAs may provide energy for rapid bursts of exertion in a subject. In still other aspects, administration of a composition disclosed herein comprising at least about 0.4 grams, about 0.5 grams, about 0.6 grams, about 0.7 grams, about 0.8 grams, about 0.9 grams, about 1.0 grams, about 1.1 grams, about 1.2 grams, about 1.3 grams, about 1.4 grams, about 1.5 grams, about 1.6 grams, about 1.7 grams, about 1.8 grams, about 1.9 grams, about 2.0 grams, about 2.5 grams, about 3.0 grams, about 3.5 grams, or about 4.0 grams total NEAAs may provide energy for rapid bursts of exertion in a subject.

In various embodiments, administration of a composition disclosed herein comprising at least one or more EAAs and at least one or more NEAAs may provide energy for rapid bursts of exertion in a subject. In various embodiments, administration of a composition disclosed herein comprising about 1% NEAAs and about 99% EAAs, about 5% NEAAs and about 95% EAAs, about 10% NEAAs and about 90% EAAs, about 15% NEAAs and about 85% EAAs, or about 20% NEAAs and about 80% EAAs by weight of total weight of the composition may provide energy for rapid bursts of exertion in a subject.

In various embodiments, administration of a composition comprising one or more nutrient elements may provide energy for rapid bursts of exertion in a subject. In other embodiments, administration of a composition comprising caffeine may provide energy for rapid bursts of exertion in a subject. In still other embodiments, administration of a composition comprising one or more excipients may provide energy for rapid bursts of exertion in a subject.

In some embodiments, administration of a composition disclosed herein to a subject may provide energy for rapid bursts of exertion in the subject by at least 5%, at least 10%, at least 15%, at least 20%, at least 25%, at least 30%, at least 35%, at least 40%, at least 45%, or at least 50% compared to exercise alone.

In some embodiments, administration of a composition disclosed herein may provide energy for rapid bursts of exertion in a young subject, a middle-aged subject, or an elderly subject by at least 5%, at least 10%, at least 15%, at least 20%, at least 25%, at least 30%, at least 35%, at least 40%, at least 45%, or at least 50% compared to exercise alone.

In some embodiments, administration of a composition disclosed herein may provide energy for rapid bursts of exertion in a subject by at least 5%, at least 10%, at least 15%, at least 20%, at least 25%, at least 30%, at least 35%, at least 40%, at least 45%, or at least 50% compared to exercise alone wherein the subject is underweight, normal-weight, over-weight or obese.

In other embodiments, administration of a composition disclosed herein may provide energy for rapid bursts of exertion in a subject by at least 5%, at least 10%, at least 15%, at least 20%, at least 25%, at least 30%, at least 35%, at least 40%, at least 45%, or at least 50% compared to exercise alone wherein the subject has one or more conditions selected from the group comprising cardiovascular disease, hypertension, osteoporosis, diabetes, metabolic disorder, and cancer.

(g) Methods of Maintaining and/or Correcting Electrolyte Balance During Exercise In various embodiments, a method maintaining and/or correcting electrolyte balance during exercise may include administration of a composition disclosed herein. In other embodiments, a method of maintaining and/or correcting electrolyte balance in a subject during exercise may include administration of a composition disclosed herein before exercise and/or during exercise. In preferred embodiments, a method of increasing maintaining and/or correcting electrolyte balance during exercise may include oral administration of a composition disclosed herein before and/or during exercise.

In some aspects, administration of at least about 3 grams to about 15 grams of a composition disclosed herein may maintain and/or correct electrolyte balance in a subject. In various embodiments, administration of a composition disclosed herein comprising one or more EAAs and one or more electrolytes may maintain and/or correct electrolyte balance in a subject. In other aspects, administration of a composition disclosed herein comprising at least about 3 grams to about 15 grams of total EEAs may maintain and/or correct electrolyte balance in a subject. In still other aspects, administration of a composition disclosed herein comprising at least 3 grams, at least 4 grams, at least 5 grams, at least 6 grams, at least 7 grams, at least 8 grams, at least 9 grams, at least 10 grams, at least 11 grams, at least 12 grams, at least 13 grams, at least 14 grams, or at least 15 grams of total EEAs and one or more electrolytes may maintain and/or correct electrolyte balance in a subject.

In various embodiments, administration of a composition disclosed herein comprising one or more NEAAs may maintain and/or correct electrolyte balance in a subject. In some aspects, administration of a composition disclosed herein comprising about 0.4 grams to about 4.0 grams total NEAAs and one or more electrolytes may maintain and/or correct electrolyte balance in a subject. In still other aspects, administration of a composition disclosed herein comprising at least about 0.4 grams, about 0.5 grams, about 0.6 grams, about 0.7 grams, about 0.8 grams, about 0.9 grams, about 1.0 grams, about 1.1 grams, about 1.2 grams, about 1.3 grams, about 1.4 grams, about 1.5 grams, about 1.6 grams, about 1.7 grams, about 1.8 grams, about 1.9 grams, about 2.0 grams, about 2.5 grams, about 3.0 grams, about 3.5 grams, or about 4.0 grams total NEAAs and one or more electrolytes may maintain and/or correct electrolyte balance in a subject.

In various embodiments, administration of a composition disclosed herein comprising at least one or more EAAs and at least one or more NEAAs may maintain and/or correct electrolyte balance in a subject. In various embodiments, administration of a composition disclosed herein comprising about 1% NEAAs and about 99% EAAs, about 5% NEAAs and about 95% EAAs, about 10% NEAAs and about 90% EAAs, about 15% NEAAs and about 85% EAAs, or about 20% NEAAs and about 80% EAAs by weight of total weight of the composition may maintain and/or correct electrolyte balance flow in a subject.

In various embodiments, administration of a composition comprising one or more nutrient elements may maintain and/or correct electrolyte balance in a subject. In other embodiments, administration of a composition comprising caffeine may maintain and/or correct electrolyte balance in a subject. In still other embodiments, administration of a composition comprising one or more excipients may maintain and/or correct electrolyte balance in a subject.

In some embodiments, administration of a composition disclosed herein to a subject may maintain and/or correct electrolyte balance in the subject by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100% compared to exercise alone.

In some embodiments, administration of a composition disclosed herein may maintain and/or correct electrolyte balance in a young subject, a middle-aged subject, or an elderly subject by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100% compared to exercise alone.

In some embodiments, administration of a composition disclosed herein may maintain and/or correct electrolyte balance in a subject by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100% compared to exercise alone wherein the subject is underweight, normal-weight, over-weight or obese.

In other embodiments, administration of a composition disclosed herein may maintain and/or correct electrolyte balance in a subject by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100% compared to exercise alone wherein the subject has one or more conditions selected from the group comprising cardiovascular disease, hypertension, osteoporosis, diabetes, metabolic disorder, and cancer.

EXAMPLES

The following examples are included to demonstrate various embodiments of the present disclosure. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1. Six normal untrained men were studied during the intravenous infusion of a balanced amino acid mixture (approximately 0.15 g·kg$^{-1}$·h$^{-1}$ for 3 hours) at rest and after a leg resistance exercise routine to test the influence of exercise on the regulation of muscle protein kinetics by hyperaminoacidemia. Leg muscle protein kinetics and transport of selected amino acids (alanine, phenylalanine, leucine, and lysine) were isotopically determined using a model based on arteriovenous blood samples and muscle biopsy. The intravenous amino acid infusion resulted in comparable increases in arterial amino acid concentrations at rest and after exercise, whereas leg blood flow was 64±5% greater after exercise than at rest. During hyperaminoacidemia, the increases in amino acid transport above basal were 30%-100% greater after exercise than at rest. Increases in muscle protein synthesis were also greater after exercise than at rest (291±42% vs. 141±45%) (FIG. 1). Muscle protein breakdown was not significantly affected by hyperminoacidemia either at rest or after exercise. These findings demonstrate a stimulatory effect of exogenous amino acids on muscle protein synthesis was enhanced by prior exercise, perhaps in part because of enhanced blood flow to the muscle. The results also suggest that amino acids taken immediately after exercise may be more anabolic than when ingested at some later time.

Figure 2:
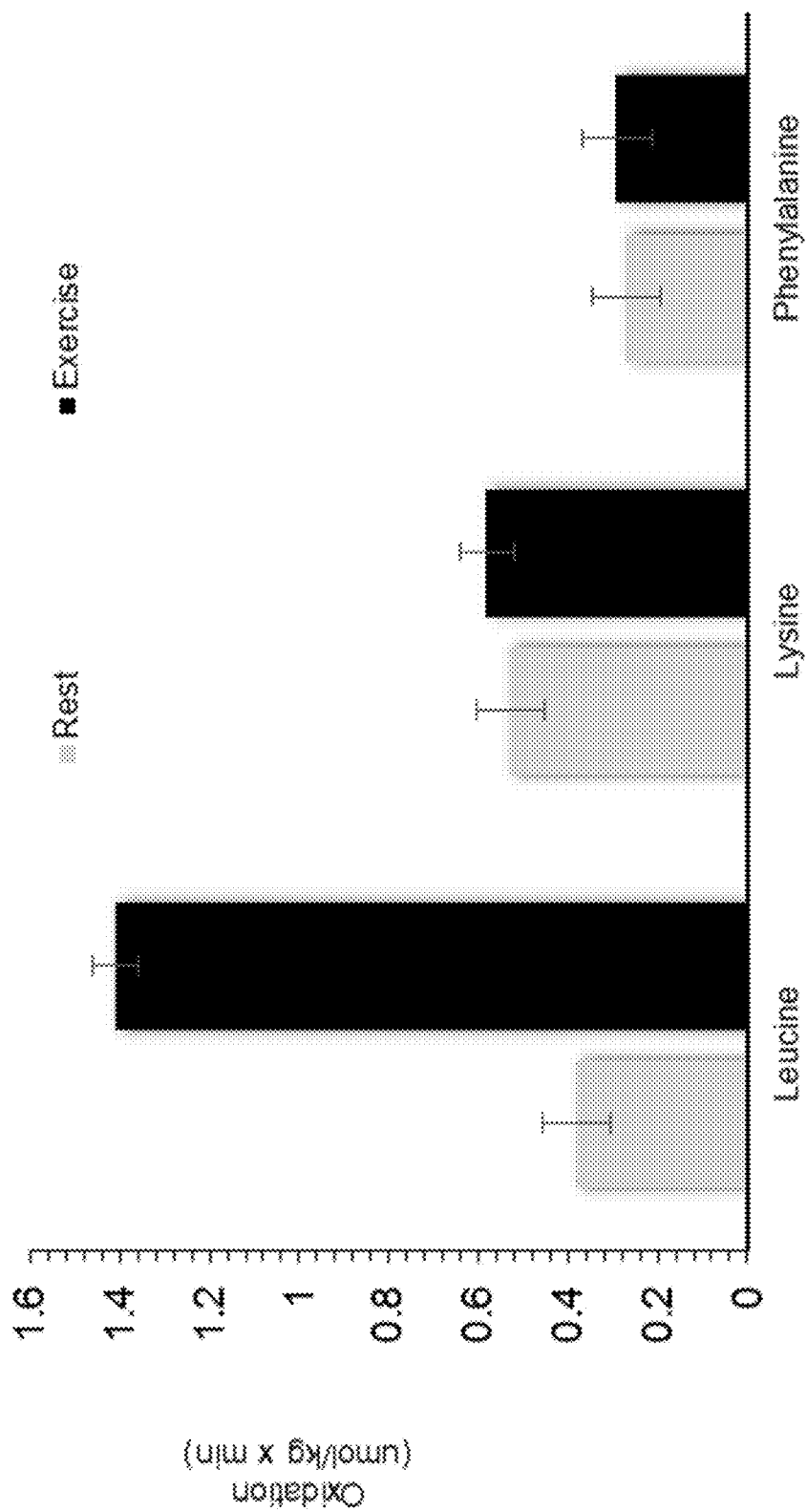
FIG. 2 depicts a graph showing leucine, lysine, and phenylalanine oxidation in human subjects at rest and during prolonged aerobic exercise (approximately 30% VO$_2$ max for 105 minutes). Error bars represent standard error of mean (SE) assessed via ANOVA.

EXAMPLE 2. To determine the effects of prolonged aerobic exercise (approximately 30% $VO_2$ max for 105 min) on the oxidation of three different EAAs in human subjects, primed constant infusion of either (1) [1-13C]leucine, (2) $\alpha$-[$^{15}$N] lysine, or (3) [$^2H_5$] phenylalanine plus [$^2H_4$]tyrosine was performed using the same methods previously described in Wolfe et al., J APPL PHYSIOL RESPIR ENVIRON EXERC PHYSIOL. 1982, 52(2):458-66 and Wolfe et al., J APPL P$_{HYSIOL}$ RESPIR ENVIRON EXERC PHYSIOL. 1984, 56(1):221-9, both the disclosures of which are herein incorporated by reference in their entirety. Total leucine oxidation increased from 0.38±0.05 to 1.41±0.14 $\mu mol \cdot kg^{-1} \cdot min^{-1}$ during exercise due to increases in the oxidation of plasma leucine (150%) and intracellular leucine (600%) (FIG. 2). Plasma leucine flux decreased slightly, but not significantly (the p-value was 0.15 where $p<0.05$ was considered significant), and the percent of alpha-ketoisocaproic acid (KICA) derived from plasma leucine dropped significantly (where $p<0.05$ was considered significant) from 79.5±4.3 at rest to 62.0±5.3% over the last 30 min of exercise. In contrast, the oxidation of lysine and phenylalanine did not change significantly from rest to exercise. As such, data showed a selective increase in oxidation of leucine during aerobic exercise. These findings provided a rational for providing extra leucine, as well as other branched chain amino acids, before exercise.

Figure 3:
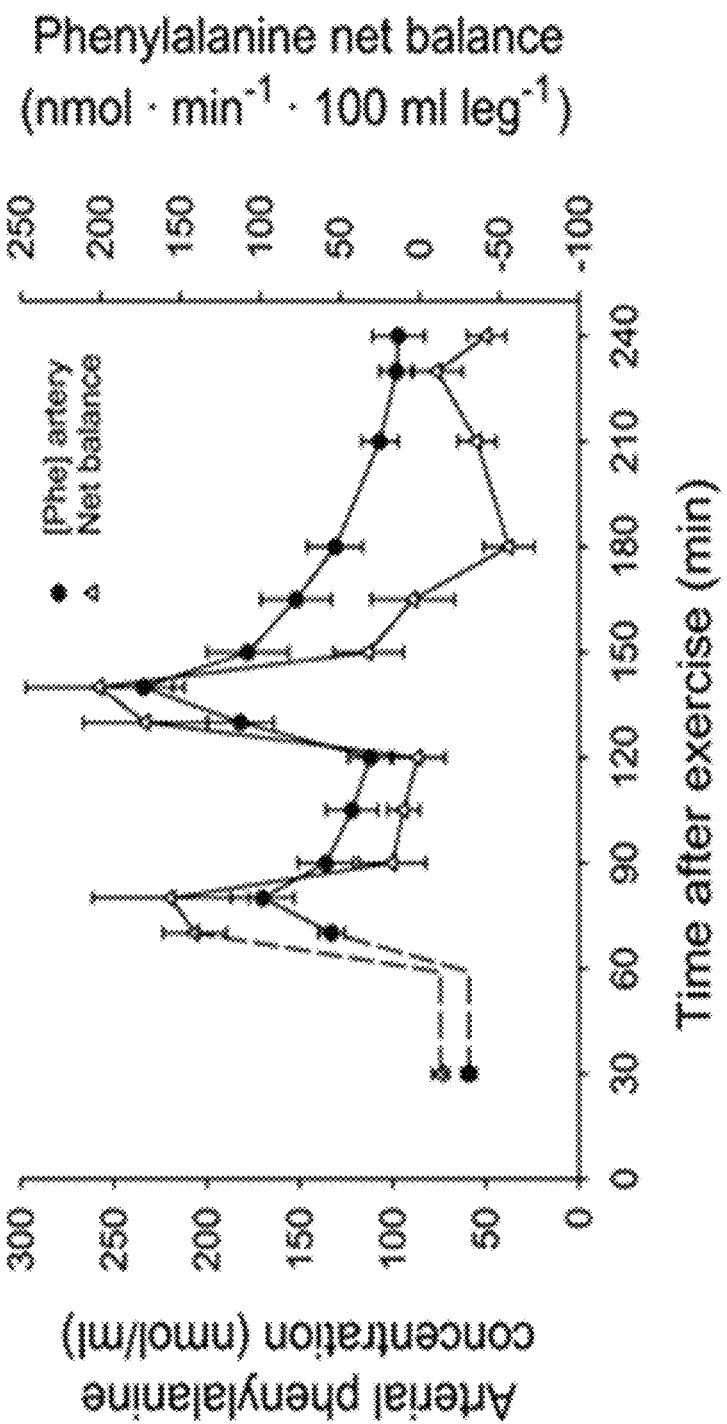
FIG. 3 depicts a graph showing arterial phenylalanine concentration and net phenylalanine balance during the recovery period after a resistance exercise bout wherein a dose of 6 grams of essential amino acids (EAAs) was administered 1 hour after resistance exercise and 2 hours after resistance exercise. Error bars represent standard error of mean (SE) assessed via ANOVA. (n=6)

EXAMPLE 3. Six healthy untrained subjects received a primed constant infusion of L-[$^2H_5$]phenylalanine and L-[1-$^{13}$C]leucine. Next, the subjects performed resistance exercises for about 40 minutes. Subjects received a dose of 6 grams of orally administered essential amino acids (EAAs) 1 hour after resistance exercise followed by another of dose of 6 grams of EAAs 2 hours after resistance exercise. Blood samples from the femoral artery and vein in addition to biopsies from vastus lateralis muscle were collected at 30, 70, 80, 90, 105, 130, 140, 150, 165, 180, 210, 220, and 240 minutes after completion of the resistance exercise regimen. Arterial EAA concentrations increased several-fold after each EAA dose where the EAA concentration a t=30 minutes was used at the baseline measurement. Because phenylalanine is neither produced nor metabolized in muscle, net phenylalanine balance reflects net muscle protein synthesis, provided there are no significant changes in the free intracellular pool of phenylalanine. As such, net muscle protein balance (NB) was calculated as follows: (phenylalanine arterial concentration−phenylalanine venous concentration)×blood flow. NB increased proportionally more than arterial EAA concentration in response to each EAA dose. NB returned rapidly to basal values when arterial EAA concentrations decreased. Area under the curve for net phenylalanine uptake above basal value was similar for the first hour after each EAA dose (67±17 mg/leg vs. 77±20 mg/leg, respectively) (FIG. 3).

Figure 4:
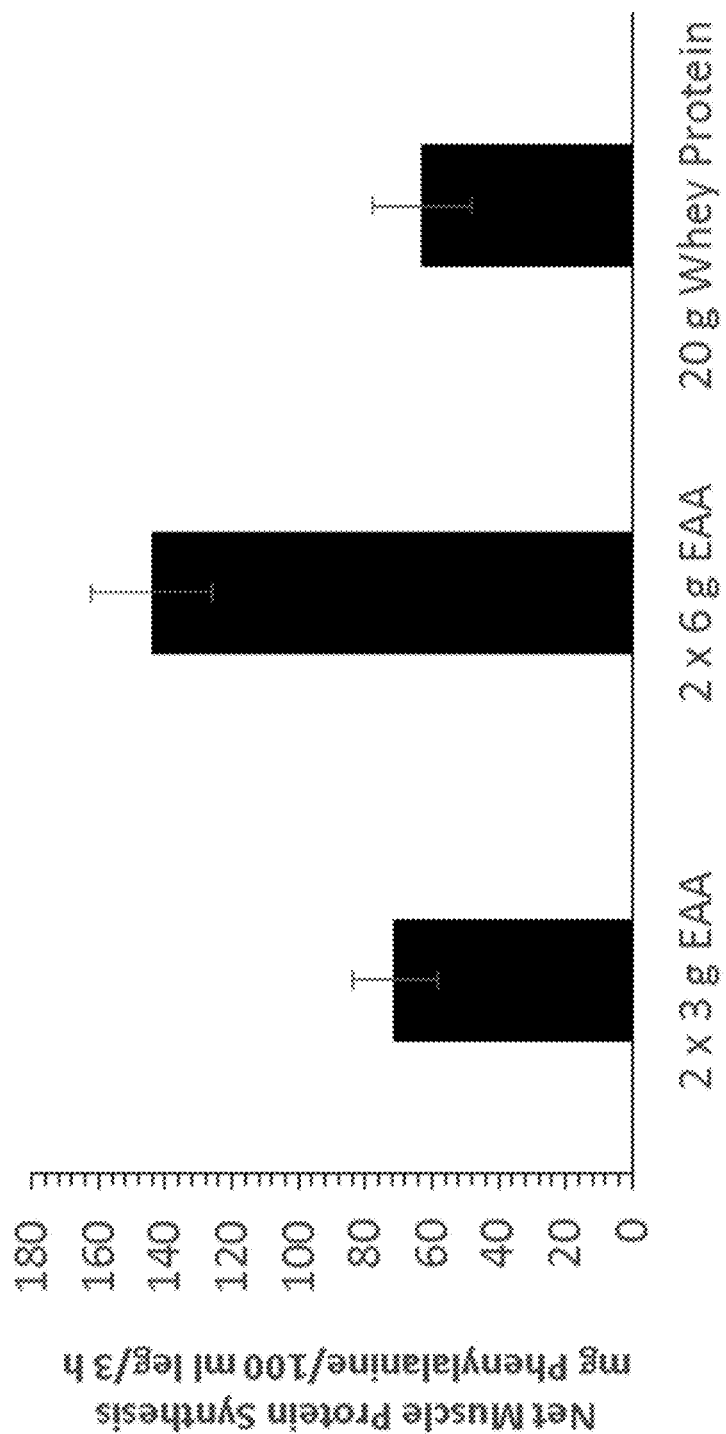
FIG. 4 depicts a graph showing the rate of muscle protein synthesis in human subjects over a 3 hour recovery period after a resistance exercise bout wherein subjects were administered either a dose of 6 grams of essential amino acids (EAAs) 1 hour after resistance exercise and 2 hours after resistance exercise, a dose of 3 grams of EAAs 1 hour after resistance exercise and 2 hours after resistance exercise, or a dose of 20 grams of whey protein 1 hour after resistance exercise. Error bars represent standard error of mean (SE) assessed via ANOVA.

Six healthy untrained subjects received a primed constant infusion of L-[$^2H_5$]phenylalanine and L-[1-$^{13}$C]leucine. Next, the subjects performed resistance exercises for about 40 minutes. Subjects received either: (1) a dose of 6 grams of orally administered essential amino acids (EAAs) 1 hour after resistance exercise followed by another of dose of 6 grams of EAAs 2 hours after resistance exercise; (2) a dose of 3 grams of orally administered essential amino acids (EAAs) 1 hour after resistance exercise followed by another of dose of 3 grams of EAAs 2 hours after resistance exercise; or (3) a dose of 20 grams of whey protein 1 hour after resistance exercise. Blood samples from the femoral artery and vein in addition to biopsies from vastus lateralis muscle were collected at 30, 70, 80, 90, 105, 130, 140, 150, 165, and 180 minutes after completion of the resistance exercise regimen. NB was calculated from samples to determine total net muscle protein synthesis over 3 hours post exercise. Total net muscle protein synthesis following 2 doses of 6 grams of EAAs was almost double total net muscle protein synthesis following 2 doses of 3 grams of EAAs and whey protein (FIG. 4). Thus, administration of a supplement containing nonessential AA (in this example, whey protein) following exercise does not stimulate muscle protein synthesis. Further, data demonstrated a dose-dependent effect of EAA ingestion on muscle protein synthesis after resistance exercise.

Figure 5:
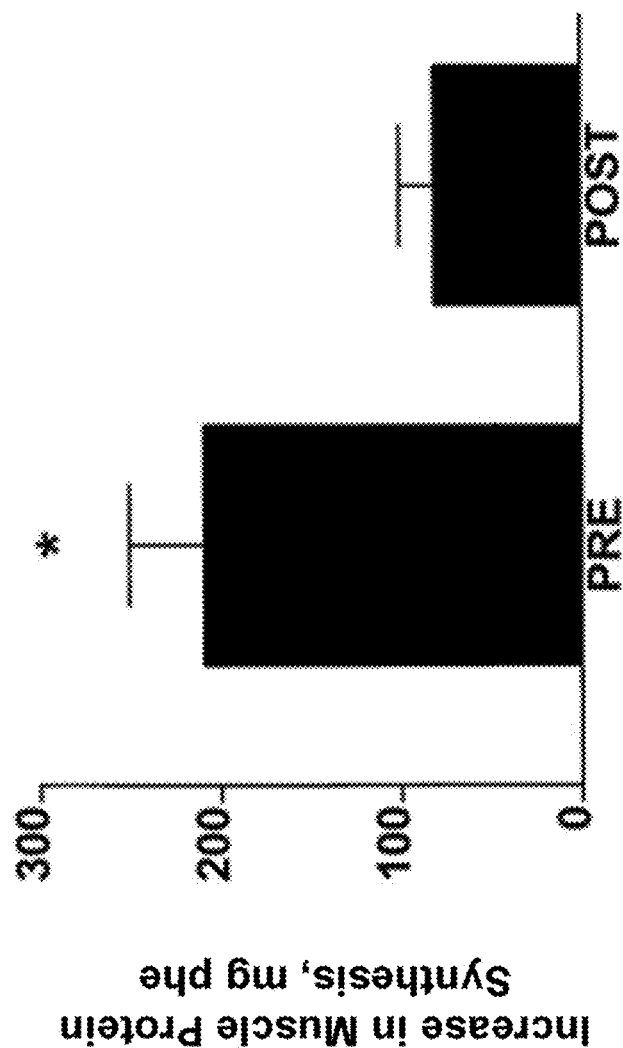
FIG. 5 depicts a graph showing the rate of muscle protein synthesis in human subjects over a 2 hour recovery period after a resistance exercise bout wherein subjects were administered an oral essential amino acid-carbohydrate supplement (EAC) immediately before resistance exercise or were administered an oral EAC supplement immediately after resistance exercise. Error bars represent standard error of mean (SE) where a p value <0.05 was significant as assessed via ANOVA.

EXAMPLE 4. This study was designed to determine whether consumption of an oral essential amino acid-carbohydrate supplement (EAC) before exercise resulted in a greater anabolic response than supplementation after resistance exercise. Six healthy human subjects participated in two trials in random order, PRE (EAC consumed immediately before exercise), and POST (EAC consumed immediately after exercise). A primed, continuous infusion of L-[ring-$^2H_5$]phenylalanine, femoral arteriovenous catheterization, and muscle biopsies from the vastus lateralis were used to determine phenylalanine concentrations, enrichments, and net uptake across the leg. Blood and muscle phenylalanine concentrations were increased by approximately 130% after drink consumption in both trials. Amino acid delivery to the leg was increased during exercise and remained elevated for the 2 hours after exercise in both trials. Delivery of amino acids (amino acid concentration times blood flow) was significantly greater in PRE than in POST during the exercise bout and in the 1st hour after exercise (where $p<0.05$ was considered significant). Total net phenylalanine uptake across the leg (direct reflection of net muscle protein synthesis) was greater ($p=0.0002$) during PRE (209±42 mg) than during POST (81±19) (FIG. 5). These results indicated that a response of net muscle protein synthesis in relation to consumption of an EAC solution immediately before resistance exercise was greater than that when an EAC solution was consumed after exercise, primarily because of an increase in muscle protein synthesis as a result of increased delivery of amino acids to muscle.

Figure 6A:
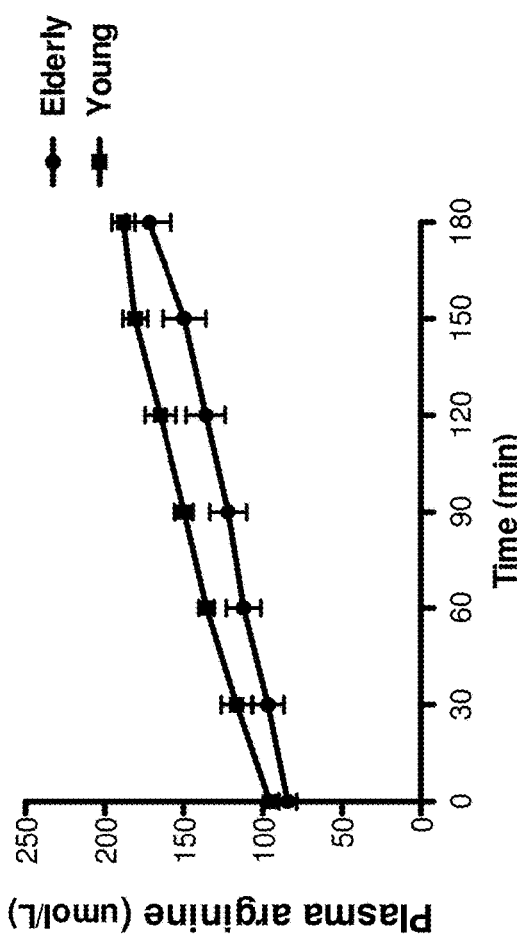
FIGS. 6A-B depicts graphs showing plasma arginine concentration (FIG. 6A) and nitric oxide (NO) synthesis (FIG. 6B) in human subjects over 3 hours following citrulline ingestion (3 grams) wherein the subjects were either elderly (n=8, 77±9 years of age, 93±4 kg) or young individuals (n=8, 27±9 years of age, 70±5 kg). Error bars represent standard error of mean (SE) assessed via ANOVA. *Significantly different from the elderly, p<0.05; †Significantly different from basal period, p<0.05.
Figure 6B:
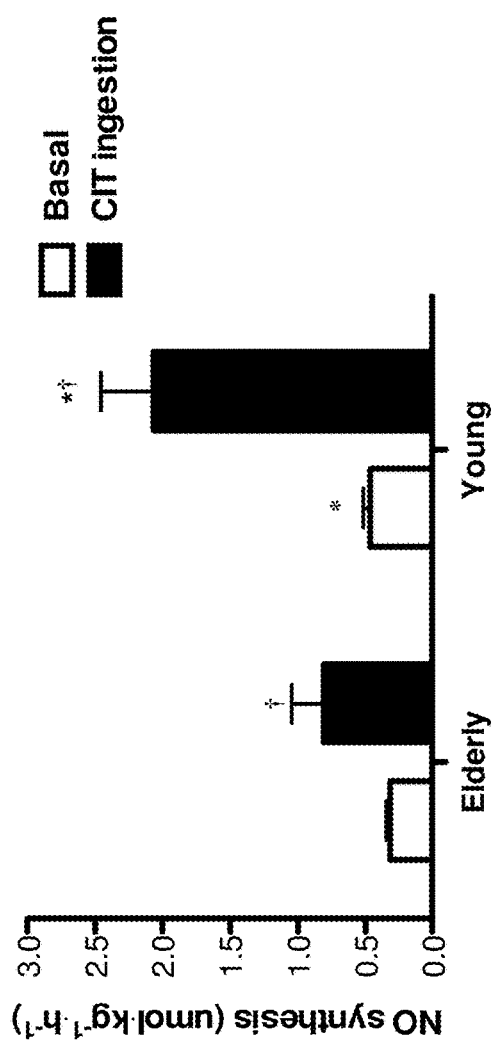

EXAMPLE 5. A kinetic study with a stable isotope tracer method was performed to determine in vivo kinetics of nitric oxide (NO) metabolism in relation to citrulline ingestion in older adult humans (n=8, 77±9 years, 93±4 kg) and in young adult humans (n=8, 27±9 years, 70±5 kg). In the fasted state, NO synthesis (expressed per kg fat free mass) was ~50% lower in older vs. young adults and was related to a decreased rate of appearance of the NO precursor arginine. Citrulline ingestion (3 grams) stimulated de novo arginine synthesis in both older (6.88±0.83 to 35.40±4.90 μmol·kg body wt$^{-1}$·h$^{-1}$) and, to a greater extent, in young adults (12.02±1.01 to 66.26±4.79 μmol·kg body wt$^{-1}$ h$^{-1}$) over 3 hours (FIG. 6A). NO synthesis rate increased correspondingly in older (0.17±0.01 to 2.12±0.36 μmol·kg body wt$^{-1}$·h$^{-1}$) and, to a greater extent, in young adults (0.36±0.04 to 3.57±0.47 μmol·kg body wt$^{-1}$·h$^{-1}$) after 3 hours (FIG. 6B). Accordingly, data showed that citrulline ingestion improved impaired NO synthesis in both young and older adults. Because arginine can play a role in stimulating muscle protein synthesis as well as increasing blood flow via NO synthesis, the data strongly support citrulline ingestion for acute as well as long-term promotion of muscle function.

Figure 7:
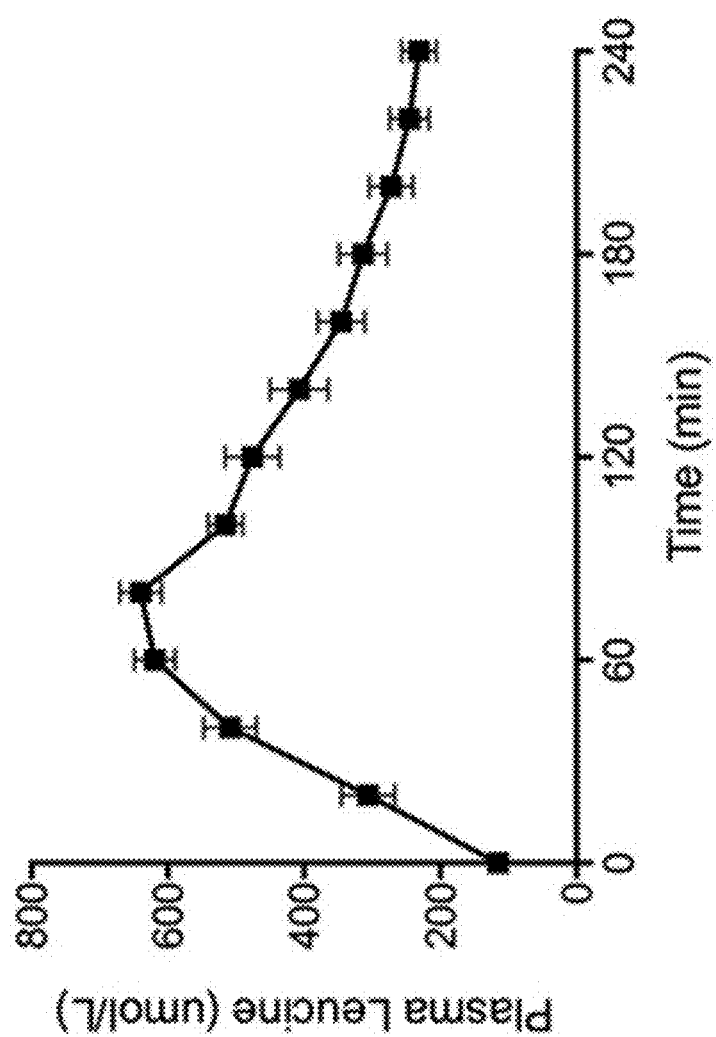
FIG. 7 depicts a graph showing plasma leucine concentration over time in human subjects for 4 hours after oral administration 11 grams of essential amino acids (EAAs), excluding tryptophan. Error bars represent standard error of mean (SE) assessed via ANOVA.

EXAMPLE 6. Eight subjects were given an oral dose of 11 g of EAAs, excluding tryptophan. Changes in plasma leucine concentration were monitored over time in subjects for up to 240 minutes following administration of EAAs, excluding tryptophan. Data indicated that the EAA dosage caused a more than 3-fold increase in plasma leucine concentration (FIG. 7).

Figure 8:
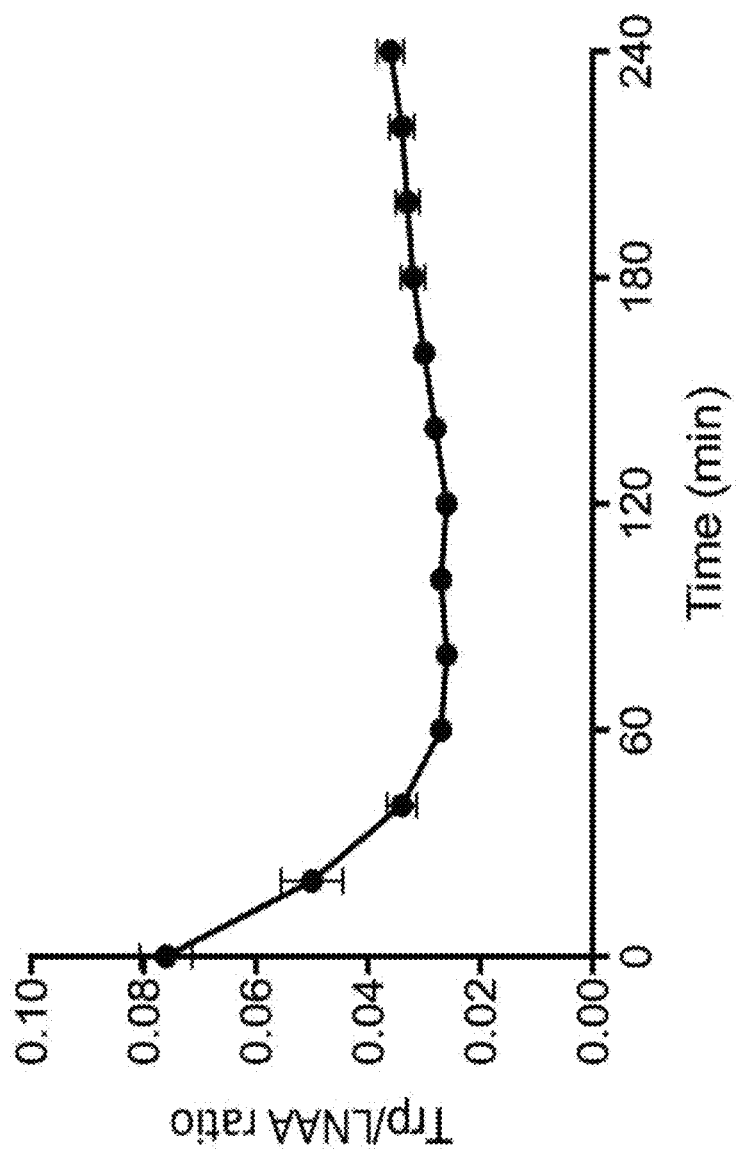
FIG. 8 depicts a graph showing the ratio of tryptophan to the sum of the other large neutral amino acids over time in human subjects for 4 hours after oral administration 11 grams of essential amino acids (EAAs), excluding tryptophan. Error bars represent standard error of mean (SE) assessed via ANOVA.

Tryptophan is transported into the brain by the large, neutral amino acid transport system that also transports the branched amino acids, phenylalanine and tyrosine. The ratio of the plasma concentration of tryptophan relative to the other large neutral amino acids may reflect the rate at which tryptophan can be transported into the brain. Accordingly, changes in plasma tryptophan and other large neutral amino acids (LNAA) concentrations were monitored over time in subjects for up to 240 minutes following administration of 11 g of EAAs, excluding tryptophan. As shown in FIG. 8, the ratio of tryptophan to LNAA concentrations in plasma dropped precipitously following EAA ingestion.

Tryptophan is the precursor of serotonin synthesis. As such, the data demonstrating decreased plasma tryptophan levels following EAA ingestion, translates into a reduction in the rate of serotonin synthesis. Because serotonin is the brain neurotransmitter that increases the perception of fatigue, reducing serotonin levels following EAA ingestion (via reduction of the precursor tryptophan) would reduce brain perception of fatigue during exercise if EAAs are taken before exercise Thus, there has been described a composition and method of using the composition to improve athletic performance by supporting muscle protein synthesis and mental focus. stimulate growth, repair and maintenance of muscle. It is apparent to those skilled in the art, however, that many changes, clarifications, modifications, other uses, and applications for the composition and method of using are possible, and also such changes, variations, modifications, other uses, and application which do not depart from the spirit and scope of the invention are deemed to be covered by the invention, which is limited only by the claims which follow.

What is claimed is:

1. A composition for increasing muscle protein mass comprising, about 4% to about 8% of L-histidine by weight of the total EAAs in the composition;
   about 10% to about 14% of L-isoleucine by weight of the total EAAs in the composition;
   about 14% to about 18% of L-lysine by weight of the total EAAs in the composition;
   about 2% to about 5% of L-methionine by weight of the total EAAs in the composition;
   about 15% to about 19% of L-phenylalanine by weight of the total EAAs in the composition;
   about 10% to about 14% of L-valine by weight of the total EAAs in the composition;
   about 7% to about 11% of L-threonine by weight of the total EAAs in the composition;
   and, about 23% to about 27% of L-leucine by weight of the total EAAs in the composition.

2. The composition of claim 1 wherein the composition comprises no less than about 23% L-leucine by weight of total EAAs.

3. The composition of claim 2 wherein the composition comprises about 0.4 to about 2.0 grams of citrulline.

4. The composition of claim 2 wherein the composition comprises creatine.

5. The composition of claim 2 wherein the composition comprises about 60 mg to about 300 mg sodium and about 10 mg to about 100 mg potassium.

6. The composition of claim 1 wherein the composition comprises one or more amino acids in free form, salt form, or a combination thereof.

7. The composition of claim 1 where the composition is a powder form of a beverage.

8. A composition, wherein the composition is capsule comprising L-histidine, L-isoleucine, L-leucine, L-lysine, L-methionine, L-phenylalanine, L-valine, L-threonine, creatine and citrulline in a capsule shell.

9. The composition of claim 8 wherein the composition comprises one or more amino acids in free form, salt form, or a combination thereof.

10. The composition of claim 8 wherein the composition comprises one or more excipients.

11. The composition of claim 1 wherein the composition comprises one or more excipients selected from a group consisting of synephrine, Citrus aurantium extract, phenylpropanolamine, caffeine, aspirin, and a combination thereof, and/or the group consisting of sibutramine, phentermine, diethylproprion, mazindol, and phendimetrazine.

12. A method of administering the composition of claim 1 to foster the production of new muscle protein.

13. The composition of claim 1 wherein the composition is a purified polypeptide incorporated into a food product.

14. A composition of claim 13 wherein the food product is selected from the group consisting of a drink, a frozen treat bar, a snack, a nutrition bar, and a bakery product.

15. The method of claim 12 wherein administration of the composition increases muscle protein synthesis in a subject.

16. The method of claim 12 wherein administration of the composition increases mental focus in a subject.

17. The method of claim 12 wherein administration of the composition reduces plasma concentrations of tryptophan relative to the concentrations of the sum of leucine, isoleucine, valine, and phenylalanine.

18. The method of claim 12 wherein administration of the composition increases plasma concentrations of tyrosine relative to the concentrations of the sum of leucine, isoleucine, valine, and phenylalanine.

19. The method of claim 12 wherein administration of the composition increases nitric oxide production.

* * * * *